(12) United States Patent
Forutanpour et al.

(10) Patent No.: US 10,325,391 B2
(45) Date of Patent: Jun. 18, 2019

(54) ORIENTED IMAGE STITCHING FOR SPHERICAL IMAGE CONTENT

(71) Applicant: QUALCOMM Incorporated, San Diego, CA (US)

(72) Inventors: Bijan Forutanpour, San Diego, CA (US); Phi Hung Le Nguyen, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 15/357,486

(22) Filed: Nov. 21, 2016

(65) Prior Publication Data
US 2018/0144520 A1 May 24, 2018

(51) Int. Cl.
| | | |
|---|---|---|
| *G06F 3/01* | (2006.01) | |
| *G06T 3/00* | (2006.01) | |
| *G06T 7/70* | (2017.01) | |
| *G06T 11/60* | (2006.01) | |
| *H04N 5/232* | (2006.01) | |

(52) U.S. Cl.
CPC .............. *G06T 11/60* (2013.01); *G06F 3/012* (2013.01); *G06F 3/013* (2013.01); *G06T 3/0018* (2013.01); *G06T 7/70* (2017.01); *H04N 5/23238* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 5,856,844 | A | 1/1999 | Batterman et al. |
| 9,445,081 | B1 * | 9/2016 | Kouperman ........... H04N 5/247 |
| 9,573,062 | B1 * | 2/2017 | Long .................... H04N 13/117 |
| 2002/0061131 | A1 * | 5/2002 | Sawhney .............. G06T 15/205 |
| | | | 382/154 |
| 2012/0092348 | A1 | 4/2012 | McCutchen |

(Continued)

FOREIGN PATENT DOCUMENTS

| | | |
|---|---|---|
| EP | 2860963 A1 | 4/2015 |
| JP | 2003284058 A | 10/2003 |

OTHER PUBLICATIONS

"GPU-Based Real-Time System for Cinematic Virtual Reality Production", by Thomas True, Dennis Sandler, and Pablo Odorico, SMPTE 2016 Annual Technical Conference and Exhibition, Oct. 25-27, 2016, pp. 1-13. (Year: 2016).*

(Continued)

*Primary Examiner* — James A Thompson
(74) *Attorney, Agent, or Firm* — Shumaker & Sieffert, P.A.

(57) ABSTRACT

Techniques are described related to generating image content. A graphics processing unit (GPU) is configured to receive a first set of images generated from a first camera device in a first location, the first camera device having a first orientation, render for display the first set of images oriented to an orientation reference, receive a second, different set of images generated from a second, different camera device in a second, different location, the second camera device having a second orientation, the second orientation being different than the first orientation, and render for display the second set of images oriented to the orientation reference.

28 Claims, 8 Drawing Sheets

(56) References Cited

U.S. PATENT DOCUMENTS

| | | | |
|---|---|---|---|
| 2013/0286012 A1* | 10/2013 | Medioni | G06T 17/00 345/420 |
| 2014/0375760 A1 | 12/2014 | Lee et al. | |
| 2015/0304652 A1 | 10/2015 | Spas | |
| 2015/0312468 A1 | 10/2015 | Taylor et al. | |
| 2016/0119541 A1 | 4/2016 | Alvarado-Moya et al. | |
| 2016/0119551 A1* | 4/2016 | Brown | G06T 3/0062 345/646 |
| 2016/0253809 A1* | 9/2016 | Cole | H04N 13/344 345/672 |
| 2016/0269632 A1 | 9/2016 | Morioka | |
| 2017/0200315 A1* | 7/2017 | Lockhart | H04N 5/23238 |
| 2018/0005429 A1* | 1/2018 | Osman | G06T 15/20 |
| 2018/0176532 A1* | 6/2018 | Gallo | H04N 5/23296 |
| 2018/0176545 A1* | 6/2018 | Aflaki Beni | H04N 5/232 |

OTHER PUBLICATIONS

"Video-Rate Panorama for Free-Viewpoint TV", by Muhammad Usman Aziz and Pierre Boulanger, 2016 13th Conference on Computer and Robot Vision (CRV), Jun. 1, 2016, pp. 228-235. (Year: 2016).*

"TransCAIP: A Live 3D TV System Using a Camera Array and an Integral Photography Display with Interactive Control of Viewing Parameters", by Y. Taguchi, T. Koike, K. Takahashi, and T. Naemura, IEEE Transactions on Visualization and Computer Graphics, Sep. 1, 2009, vol. 15, No. 5, pp. 841-852. (Year: 2009).*

Jones B., "Dual-Camera 360 Panorama Application", Intel Developer Zone, Nov. 11, 2013, pp. 1-9.

Deng et al., "Automatic Spherical Panorama Generation with Two Fisheye Images", National Laboratory of Pattern Recognition, Institute of Automation, Jun. 25-27, 2008, 5 pp.

Liao et al., "Real-Time Spherical Panorama Image Stitching Using OpenCL", Department of Computer Science and Information Engineering, National Taipei University of Technology, Taipei, Taiwan, Jun. 8, 2016, 7 pp.

Puentes et al., "Elucidating Peirce Quincuncial Projection", May 24, 2016, retrieved from http://fwcg14.cse.uconn.edu/program/wp-content/uploads/sites/863/2014/10/fwcg2014_submission_2.pdf, 2 pp.

International Search Report and Written Opinion—PCT/US2017/055932—ISA/EPO—dated Dec. 13, 2017 (17 pp).

* cited by examiner

FIG. 6A  FIG. 6B

ORIENTED IMAGE STITCHING FOR SPHERICAL IMAGE CONTENT

TECHNICAL FIELD

The disclosure relates to spherical image rendering.

BACKGROUND

In certain types of image rendering, such as rendering images for a 360-degree video, a viewer can perceive multiple different views of image content. For instance, while a viewer is viewing the image content on a display, the viewer can select a different view from which to view the content.

SUMMARY

In general, the disclosure describes techniques for presenting image content from two different camera devices in a common orientation reference. Two camera devices may each include respective fisheye cameras, and each camera device captures respective 360-degree image content. A viewer may view the image content captured by one of the camera devices, and then switch to image content captured by another camera device (e.g., as selected by the viewer or a server outputting the image content). If the presented image content from the different camera devices is not oriented to a common orientation reference, the transition from image content from one camera device to image content of another camera may require reorientation by the viewer (e.g., shift of where the viewer is viewing). By presenting image content from different camera devices oriented in a common orientation reference, the transition from image content from different camera devices may not need reorientation by the viewer. Thus, the transition in presenting image content captured from one camera to image content captured by another camera may be relatively smooth, providing for a more immersive and improved experience as compared to examples where a viewer reorients.

In one example, the disclosure describes a method for generating image content, the method comprising receiving a first set of images generated from a first camera device in a first location, the first camera device having a first orientation, rendering for display the first set of images oriented to an orientation reference, receiving a second, different set of images generated from a second, different camera device in a second, different location, the second camera device having a second orientation, the second orientation being different than the first orientation, and rendering for display the second set of images oriented to the orientation reference.

In another example, the disclosure describes a device for generating image content, the device comprising a memory device configured to store a first set of images generated from a first camera device in a first location, the first camera device having a first orientation, and store a second, different set of images generated from a second, different camera device in a second different location, the second camera device having a second orientation, the second orientation being different than the first orientation, and a graphics processing unit (GPU) comprising at least one of fixed-function or programmable circuitry, the GPU configured to receive the first set of images from the memory device, render for display the first set of images oriented to an orientation reference, receive the second set of images from the memory device, and render for display the second set of images oriented to the orientation reference.

In another example, the disclosure describes a computer readable storage medium having instructions stored thereon that when executed cause one or more processors to receive a first set of images generated from a first camera device in a first location, the first camera device having a first orientation, render for display the first set of images oriented to an orientation reference, receive a second, different set of images generated from a second, different camera device in a second, different location, the second camera device having a second orientation, the second orientation being different than the first orientation, and render for display the second set of images oriented to the orientation reference.

In another example, the disclosure describes a device for generating image content, the device comprising means for receiving a first set of images generated from a first camera device in a first location, the first camera device having a first orientation, means for rendering for display the first set of images oriented to an orientation reference, means for receiving a second, different set of images generated from a second, different camera device in a second, different location, the second camera device having a second orientation, the second orientation being different than the first orientation, and means for rendering for display the second set of images oriented to the orientation reference.

The details of one or more examples are set forth in the accompanying drawings and the description below. Other features, objects, and advantages will be apparent from the description, drawings, and claims.

BRIEF DESCRIPTION OF DRAWINGS

FIGS. 6A and 6B are pictorial diagrams illustrating images captured from the device of FIG. 1.

DETAILED DESCRIPTION

Figure 1:
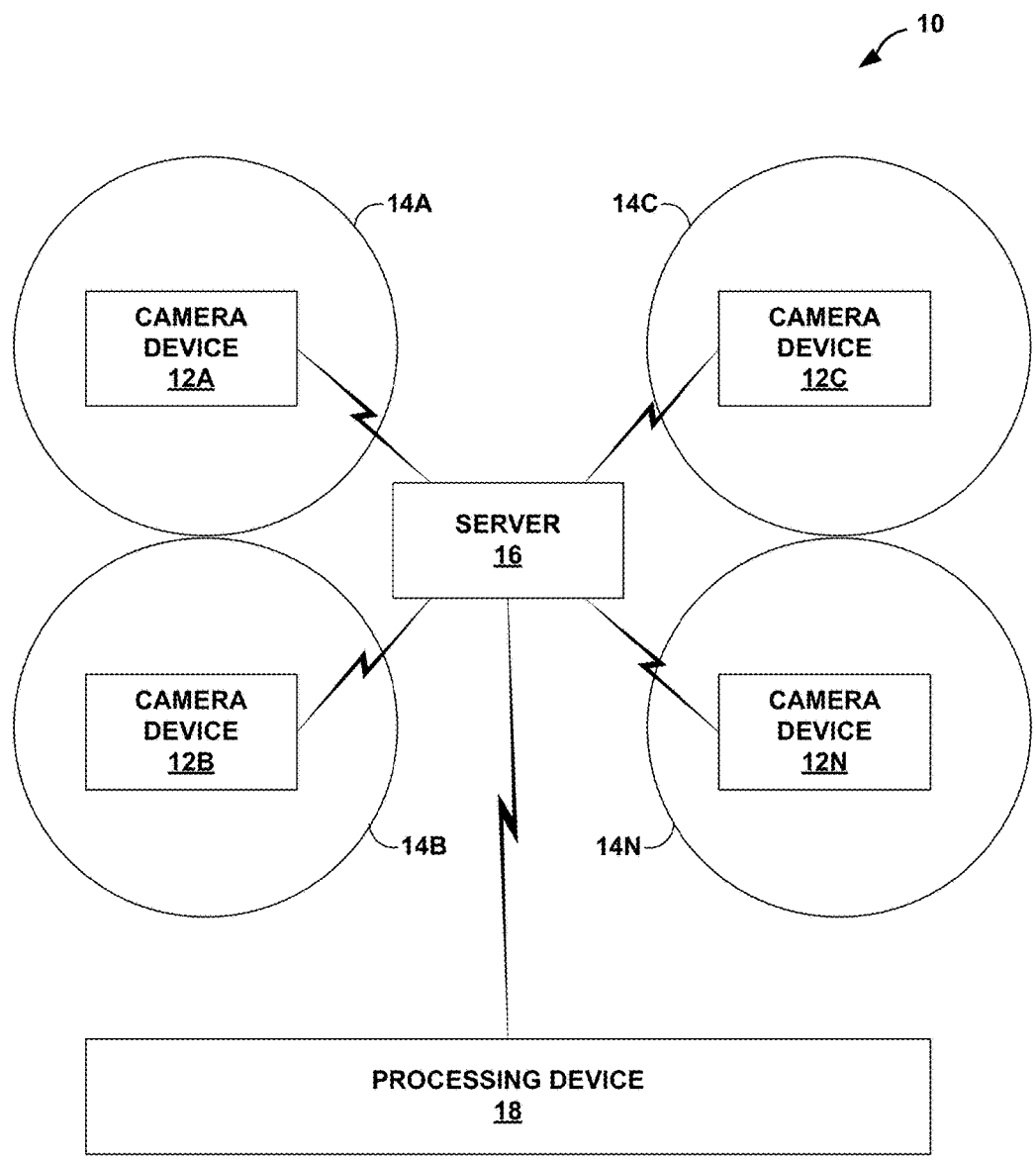
FIG. 1 is a block diagram illustrating a multi-camera image capturing system in accordance with one or more example techniques described in this disclosure.

The example techniques described in this disclosure are related to presenting a 360-degree video or image. In a 360-degree video or image, the video/image content forms a conceptual sphere around the viewer. The viewer can view image content from multiple perspectives (e.g., in front, behind, above, and all around), and such image content is called a 360-degree image.

In this disclosure, an image that includes 360-degree of image content or viewable content means that the image includes content for all perspectives (e.g., content above, below, behind, in front, and on each sides). For instance, conventional images capture slightly less than 180-degree of image content, and do not capture content on the sides of the camera.

In general, a 360-degree video is formed from a sequence of 360-degree images. Accordingly, the example techniques described in this disclosure are described with respect to generating 360-degree images. Then, for 360-degree video content, these 360-degree images can be displayed sequentially. In some examples, a user may desire to take only a 360-degree image (e.g., as a snapshot of the entire 360-degree surrounding of the user), and the techniques described in this disclosure are applicable to such example cases as well.

The techniques may be applicable to captured video content, virtual reality, and generally to video and image displaying. The techniques may be used in mobile devices, but the techniques should not be considered limited to mobile applications. In general, the techniques may be for virtual reality applications, video game applications, or other applications where a 360-degree spherical video/image environment is desired.

The 360-degree image content may be captured with a camera device that includes a plurality of fisheye lenses (e.g., positioned to capture portions of the sphere of image content). The fisheye lenses capture respective portions of the full sphere of the a 360-degree video. The images generated by the captured portions may be circular images (e.g., one image frame includes plurality of circular images from respective fisheye lenses). The camera device that captured the images, a processing device on which the images are to be displayed, or some other device converts the circular images into an image type more suitable for graphics processing and/or transmitting. The image type more suitable for graphics processing and/or transmitting is referred to as a projection image, examples of which include equirectangular projection, cubic projection, cylindrical projection, spherical projection, pierce-quincunical projection, etc.

As described above, a camera device includes a plurality of fisheye lenses. Some example camera devices include two fisheye lenses, but the example techniques are not limited to two fisheye lenses. One example camera device may include 16 lenses (e.g., 16-camera array for filming 3D VR content). Another example camera device may include eight lenses, each with 195-degree angle of view (e.g., each lens captures 195 degrees of the 360 degrees of image content). Other example camera devices include three or four lenses. Some examples may include a 360-degree lens that captures 360-degrees of image content.

The example techniques described in this disclosure are generally described with respect to two fisheye lenses capturing a 360-degree image/video. However, the example techniques are no so limited. The example techniques may be applicable to example camera devices that include a single 360-degree lens, a plurality of lenses (e.g., two or more) even if the lenses are not fisheye lenses, and a plurality of fisheye lenses.

For instance, as described in the more detail, the example techniques describe ways to create seamless transition in viewing content captured by one camera device to content captured by another camera device. Such techniques may be applicable to a wide variety of different camera types, such as those described above. While the example techniques are described with respect to two fisheye lenses, the example techniques are not so limited, and applicable to the various camera types used for capturing 360-degree images/videos.

In a multi-camera environment, there may be a plurality of these example camera devices located in different locations, each capturing respective image content. A viewer may be viewing image content captured by one of the camera devices, and then switch to viewing image content from another one of the camera devices. In some cases, the switch in the image content from one camera device to another camera device may be jarring to the viewer.

In generating the projection image, the device that generates the projection image (e.g., the camera device, server, or processing device) may orient the projection image to an arbitrary orientation, which may be different for each of the camera devices. For example, in some cases, the orientation of a first set of images from a first camera device, and the orientation of a second set of images from a second camera device may be different (e.g., the lenses of the camera device used for generating images in the first set of images may be in a first direction or orientation, and the lenses of the camera device used for generating images in the second set of images may be in a second direction or orientation). Therefore, when switching from images captured from one camera device to another camera device, it is possible that the viewer may become disoriented (e.g., the area of interest is no longer directly in front of the viewer, but off to some other angle). After the viewer reorients (e.g., physically moves head or body, reorients the display, or controls interface to reorient the image that is displayed), then the images would appear correct, but needing such reorientation may be undesirable to the viewer.

In the example techniques described in this disclosure, the device that displays the images from different camera devices may present the images such that images from different camera devices have the same orientation along different references. As an example, each camera device may include a sensor (e.g., a magnetometer sensor or compass) that indicates the direction of a geographical direction (e.g., North, South, East, or West). In this example, the geographical direction is an orientation reference. In generating the projection image, the device generating the projection image may utilize the geographical direction information to orient the projection image such that the geographical direction is at a set point. For example, the device generating the projection image may orient the image such that the North direction relative to the camera device is at the top-center of the image. If the device generating the projection images ensures that images are always oriented such that the North direction relative to the respective camera devices is at the top-center of the image, then switching images from one camera to another may not be jarring or require the viewer to reorient.

If each of the camera devices generates the projection images, then each of the camera devices may be configured to orient their own projection images to a common orientation reference. Although possible, the camera devices need not necessarily communicate with one another to orient images to a common orientation reference, but may each be configured to orient projection images to a particular orientation reference that is common to each camera devices.

If the server or the processing device that presents the 360-degree images generates the projection images, then the server or the processing device may receive information indicative of the orientation reference from respective camera devices for the respective sets of images. For example, the server or the processing device may receive information from a first camera device indicating the direction of North relative to a first set of images from the first camera device, receive information from a second camera device indicating the direction of North relative to a second set of images from the second camera device, and so forth. The server or the processing device may then adjust (e.g., shift, rotate, shear, or distort) the first and second sets of images based on the information indicative of the orientation reference such that the images are oriented to the same orientation reference (e.g., North is in the same location in each sets of pictures).

In the above example techniques, the server or the processing device may orient images from different camera devices common to one plane (e.g., the direction of North). For instance, the server or processing device orients images from different camera devices to a common azimuth. In some examples, the server or the processing device may orient images from different camera devices to other common planes. For example, the server or processing device may orient images from different camera devices to a common tilt (e.g., common altitude reference).

Orienting images to a common tilt may allow the viewer to not have to tilt his/her eyes up or down when transitioning to a different camera device. For instance, it may be possible for two projection images to be naturally formed so that North is in the top direction. However, the tilt of the images may be different. As an example, the top of the images looks closer and the bottom of the images looks further away, or vice-versa, in images from one camera device as compared to images from another camera device. By orienting to a common tilt (e.g., altitude), the viewer may not need to reorient the tilt during the transition from one camera device to another camera device.

In some examples, the sever or the processing device may orient images from different camera devices to a common rotational angle along an optical axis. For instance, there is an optical axis for each lens in each camera device, where the optical axis is a hypothetical axis extending outward from the center of the lens. Because of the different orientations of the camera devices, the optical axis of each of the optical lenses may not be oriented to a common reference.

Having different rotational angles along an optical axis may result in right end of images look closer and left end of images look further away, or vice-versa, in images from one camera device as compared to images from another camera device. By orienting to a common rotational angle, the viewer may not experience such changes in the transition from rendered images from one camera device to another camera device.

In this way, the server or the processing device may orient images to a common reference based on azimuth (e.g., direction), altitude (e.g., tilt), and rotation. It should be understood that the server or processing device may orient images based on one or more of direction, tilt, and rotation. For instance, the server or the processing device may orient images based on a first orientation reference (e.g., one of direction, tilt, or rotation), a first orientation reference and a second orientation reference (e.g., another of direction, tilt, or rotation), or a first orientation reference, a second orientation reference, and a third orientation reference (e.g., direction, tilt, and rotation).

In the above examples, the example orientation references have been based on global positions of the orientations of the camera devices. In some examples, in addition to or instead of the above orientation references, the server or the processing device orient images from different cameras based on scene content and/or gaze of the viewer. For instance, the orientation reference may be selected based on the scene, gaze (e.g., eye position), or head position of the viewer. As an example, the common reference may be common portions in image content in images captured by one camera device and images captured by another camera device to which the viewer is transitioning. As another example, the common reference may be areas where the viewer is looking (e.g., based on the gaze or head position of the viewer). In such examples, the server or the processing device may orient images from different cameras so that the viewer can keep the same gaze or head position. For instance, the server or processing device may select the orientation reference based on the gaze or head position of the viewer.

FIG. 1 is a block diagram illustrating a multi-camera image capturing system in accordance with one or more example techniques described in this disclosure. For example, FIG. 1 illustrates a multi-camera image capturing system 10 that includes plurality of camera devices 12A-12N (collectively referred to as "camera devices 12"). The example illustrated in FIG. 1 may be applicable to cases where multiple camera rigs for cooperating recording are useful.

Camera devices 12 may be standalone camera devices placed in different locations in a setting. For example, during a wedding, camera devices 12 may be placed in various locations on tripods throughout the wedding. As another example, for capturing different images for a house tour, camera devices 12 may be placed in different locations throughout the house. Camera devices 12 need not necessarily remain still in the setting, and can be moveable as well.

Camera devices 12 may be configured to record a 360-degree spherical environment to enhance viewer experience. Unlike standard cameras that capture an image of only that which is in front of the camera lens, camera devices 12 may be configured to capture a much larger area, including image content in all directions. As illustrated, each of camera devices 12 captures image content 14A-14N (collectively image contents 14), respectively. Although not illustrated, there may be overlap between image contents 14.

Each of camera devices 12 may transmit their respective captured image contents 14 to server 16. Server 16 may correspond to a file server or another intermediate storage device that may store image contents 14 captured by camera devices 12. Processing device 18 may access stored captured image content 14 from server 16 via streaming or download. Server 16 may be any type of server capable of storing and transmitting image contents 14 to processing device 18. Example file servers include a web server (e.g., for a website), an FTP server, network attached storage (NAS) devices, or a local disk drive.

Camera devices 12 and processing device 18 may transmit data to and receive data from server 16 in various ways. As one example, camera devices 12 may each capture respective image contents 14 and store image contents 14 locally. At the conclusion of the event, a technician (e.g., technician from wedding photography company or technician from house selling agent) may download image contents 14 via a wired connection to a local computing device (not illustrated), and upload image contents 14 via wireless channel (e.g., a Wi-Fi connection) or wired connection (e.g., DSL, cable modem, etc.), or a combination of both. As another example, camera devices 12 may each wirelessly or via a wired connection transmit image contents 14 to server 16. Processing device 18 may download image contents 14 from server 16 via a wireless or wired connection. Processing device 18 and camera devices 12 may communicate with server 16 via any data connection, including an Internet connection.

In some examples, server 16 may receive captured image contents 14 in real-time, and processing device 18 may download captured image contents 14 in real-time, such as for a sporting event or a concert. Other permutations and combinations are possible, and the techniques described in this disclosure should not be considered limited to any of these specific examples.

Server 16 may receive captured image contents 14 in various formats. As one example, server 16 may receive captured image contents 14 in their captured image format. As described in more detail below, camera devices 12 include lenses that capture the 360-degree image contents 14, one example of lenses used to capture the 360-degree image contents 14 are fisheye lenses, but other lens types are possible. For ease of description the examples are described with respect to fisheye lenses.

The captured image format may be circular images resulting from the image contents 14 captured by the fisheye lenses, for other examples where fisheye lenses are not used, the image format may be different than circular images. In some examples, server 16 may receive captured image contents 14 in a format where the captured images are further processed. For example, camera devices 12 may include a graphics processing unit (GPU) that processes the images to generate a projection image, where the projection image is some form of blending of the images into a single image that is then mapped onto a two-dimensional or three-dimensional structure. Blending generally refers to mixing color values of images that overlap. Camera devices 12 may transmit respective projection images to server 16, where each projection image from respective ones of camera devices 12 includes respective image contents 14.

Processing device 18 receives the images from server 16 in examples where server 16 stores the images received from camera devices 12, and/or receives the projection images from server 16 in examples where server 16 stores the projection images. Processing device 18 may perform additional processing on the received images (e.g., circular images and/or projection images), and present the resulting images for display to a viewer.

In some examples, processing device 18 may be presenting a set of images from one of camera devices 12 (e.g., camera device 12A). For example, assume that camera device 12A is placed in a hallway in a house. In this example, the viewer is able to view all of image content 14A. For instance, the viewer may interact with processing device 18 such that the viewer can change the viewing angle and view image content 14A from any viewing angle.

The viewer may then interact with processing device 18 so that the viewer perceives that the viewer is traveling through image content 14A towards one of image contents 14B-14N. For example, if camera device 12A is in the hallway, camera device 12B may be in the doorway of a bedroom. In this example, the viewer may interact with processing device 18 so that the viewer perceives walking through the hallway and towards the doorway. As the viewer gets closer to camera device 12B, processing device 18 may switch from presenting image content 14A to image content 14B.

For example, server 16 may upload images or projection images for image content 14A to processing device 18 based on the perceived location of the viewer within the setting captured by camera devices 12. For instance, processing device 18 may output information to server 16 indicating the relative location of the viewer. Based on the relative location, server 16 may output images for one of image contents 14 to processing device 18. As another example, server 16 may broadcast a plurality of image contents 14 (including possibly all of image contents 14) and include information of areas covered by respective image contents 14. In such examples, processing device 18 may determine which one of image contents 14 to present to the viewer. Other ways for server 16 and/or processing device 18 to determine which one of image contents 14 to transmit/present may be possible.

In some cases, each one of camera devices 12 may generate respective projection images without there being a common orientation reference across camera devices 12. For instance, each one of camera devices 12 may generate its projection image based on the angles of its lenses. Because the lenses of each of camera devices 12 may be at different angles, there is no common orientation reference in the projection images. For instance, the lenses of camera devices 12 may be facing different directions or have different orientations, and therefore, the lenses of each of camera devices 12 may be at different angles.

In examples where camera devices 12 transmit the images, and server 16 generates the projection images, server 16 may similarly generate the projection images based on angles of the lenses, such that there is no common orientation reference in the projection images. Similarly, in examples where processing device 18 receives images that have not yet been converted to projection images (e.g., circular images for fisheye lenses), processing device 18 may generate the projection images based on angles of lenses (e.g., relative to a fixed reference), such that there is no common orientation reference in the projection images.

One possible issue with the lack of a common orientation reference in the different projection images is that switching from one of image contents 14 from one of camera devices 12 to another one of image contents 14 from another one of camera devices 12 can be a jarring experience for the user. For example, regardless of which device generated the projection images, processing device 18 renders the projection images from one of image contents 14 (e.g., image content 14A) for display. While presenting image content 14A, the viewer may initially orient image content 14A on processing device 18 such that the content is presented correctly (e.g., how one would normally perceive the content, with focus on the area of interest). Then, when processing device 18 switches from image content 14A to image content 14B, image content 14B may not appear correct, but disoriented. This is because there is no common orientation in the projection images for image content 14A and image content 14B resulting in a shift in orientation when processing device 18 switches from one of image contents 14 to another one of image contents 14.

For example, camera devices 12 capture and record a 360-degree field of view horizontally (and vertically in some cases), and there is no sense of "recording direction." This results in the viewer orienting himself or herself in the 360-degree viewing sphere.

This disclosure describes example techniques to present image from different camera devices 12 located in different locations oriented to a same orientation reference. With this common orientation, when processing device 18 switches from presenting one of image contents 14 to another one of image contents 14, the viewer may not need to reorient.

One example way to orient the projection images is for camera devices 12 to each orient their projection images based on an orientation reference that is the same for all camera devices 12. For example, a geographical direction (e.g., North, South, East, West) will be the same for all camera devices 12 regardless of their specific lens angles (e.g., regardless of how the lens are pointing). In some examples, camera devices 12 may be configured to orient their respective projection images such that a geographical direction is located at the same coordinate point in each of the projection images. For instance, each one of camera devices 12 may generate their respective projection images such that true North (e.g., North Pole) is located in the same coordinate point (e.g., content that is located true North is located at the top-center of the projection image).

It should be reiterated that each one of camera devices 12 is capturing the 360-degree of image contents 14. Therefore, in each of the circular images there is content that is located directly North relative to camera devices 12. Stated another way, an individual person who is holding camera device 12A may take a snapshot. Because the snapshot is of the entire 360-degree of viewable area, there is a guarantee that content from true North is captured. Therefore, in at least one of the circular images, there is content from true North. In generating the projection image based on the circular images, each one of camera devices 12 may generate the projection image such that in the projection image, the content for true North is located at the top-center of the projection image. In this example, the projection images from camera devices 12 are each oriented to an orientation reference, which is centering the projection image to true North. Centering the projection image to a direction such as true North is one example, and the techniques are not so limited.

To allow each one of camera devices 12 to generate projection images with such a common orientation reference, camera devices 12 may include sensors to generate information of the orientation reference. For example, camera devices 12 may include magnetometer sensors (also referred to as compasses) that can indicate a geographical direction. Camera devices 12 may utilize the direction of the particular geographical direction to adjust the projection images such that a particular geographical direction is aligned at the same coordinate point in each of the projection images. Then, when processing device 18 renders for display the projection images, there may not be a need for the viewer to reorient when switching image contents 14.

Using a compass and a particular geographical direction is one example, and should be not be considered limiting. In some examples, camera devices 12 may include an inertial-measurement unit (IMU) and/or gyroscope as a way to provide a common orientation reference. In some examples, camera devices 12 may use a compass, IMU, and/or gyroscope. For example, camera devices 12 may use the compass to orient to a particular geographical direction, and may use the IMU and/or gyroscope to control orientation in another dimension (e.g., orient the tilt to a common orientation reference, etc.).

Orienting projection images to a particular direction (e.g., where North is located at the top-center in each image) is an example of orienting images from different camera devices 12 to a common azimuth reference. Orienting projection images to a particular tilt is an example of orienting images from different camera devices 12 to a common altitude reference. There may be other examples of orienting images. As one example, each of camera devices 12 is associated with an optical axis, which is a hypothetical axis extending outwards from a center of the lenses of camera devices 12. Because of the positioning of camera devices 12, the images from camera devices 12 may not be oriented to a common rotational angle along the optical axis. In some examples, camera devices 12 may include one or more IMUs and/or gyroscopes. One of the IMUs and/or gyroscopes may be used for determining tilt. Another one of the IMUs and/or gyroscopes may be used for determining rotational angle (e.g., a amount by which respective camera devices 12 are shifted relative to an optical axes).

Orienting projection images along a directional reference, tilt reference, or rotational angle reference are various examples of orientation references. The techniques described in this disclosure may orient projection images with respect to one or more of these example orientation references (e.g., one of the orientation reference, some of the orientation references, or all of the orientation references).

Orienting projection images from different ones of camera devices 12 to a common orientation reference that is based on direction or orientation of camera devices 12 is one example of orienting projection images from different ones of camera devices 12 to a common orientation. However, the examples described in this disclosure may be applicable for other types of orientation references, such as orientation references based on computer vision-based approaches such as scene content and gaze and/or head position of the viewer.

As an example, a viewer may be viewing particular scene content (e.g., an area of interest) from images from a first one of camera devices 12 (e.g., camera device 12A). There may be some overlap in the scene content in images from another one of camera devices 12 (e.g., camera device 12B). In such examples, processing device 18 may render images from camera device 12B such that scene content common to both images from camera device 12A and images from camera device 12B are being displayed in a substantially same location. For example, processing device 18 may render scene content common to both the images from camera device 12A and images from camera device 12B such that the common scene content is displayed in the rendered images from camera device 12B in the same location as the location of the common scene content in the rendered images from camera device 12A.

As an illustration, in the example where camera devices 12 are placed in a home for a home tour, camera device 12A may be placed in a hallway and camera device 12B may be placed in a bedroom. As the viewer interacts processing device 18 such that the viewer is walking through the hallway and facing the doorway into the bedroom, processing device 18 may be displaying image content captured by camera device 12A. Then, when the viewer interacts to enter the bedroom, processing device 18 may being to display image content captured by camera device 12B. In this example, the image content captured by camera device 12A, that the viewer initially views when facing the doorway may overlap with the image content captured by camera device 12B (e.g., camera device 12B may also capture image content at the doorway of the bedroom). Processing device 18 may render, at the instance of the transition from image content captured by camera device 12A to image content captured by camera device 12B, image content captured by camera device 12B to a common orientation as that of the rendered images of the image content captured by camera device 12A, which in this example is a common scene content. By orienting to common scene content, the viewer may perceive smoother transition.

As another example, a viewer may be viewing particular scene content (e.g., an area of interest) by focusing his/her gaze or head at a particular angle when viewing image content captured by a first one of camera devices 12 (e.g., camera device 12A). When transitioning image content captured by camera devices 12A to a second one of camera devices 12 (e.g., camera device 12B), processing device 18 may render image content captured by camera device 12B based on a position of a viewer gaze or head when the viewer was viewing images captured by camera device 12A. For example, processing device 18 may render image content captured by camera device 12B such that the viewer does not need to change his/her gaze or head position. For instance, the image content that is of the area of interest to the viewer, as based on viewer gaze or head position, is preserved in the same location when transitioning from image content captured by a first one camera devices 12 to a second one of camera devices 12. In this example, processing device 18 may select the orientation reference based on the determined gaze or head position of the viewer.

In the above examples, camera devices 12 generated the projection images. However, the techniques are not so limited. In examples where server 16, processing device 18, or some other device generates the projection images, camera devices 12 may transmit information indicating the alignment of a particular dimension and/or tilt and/or rotational angle (in example of IMU or gyroscope) to server 16, processing device 18 or this other device, along with the circular images. Server 16, processing device 18, or possibly this other device may perform the example techniques described above to orient the projection images to a common orientation reference.

Figure 2A:
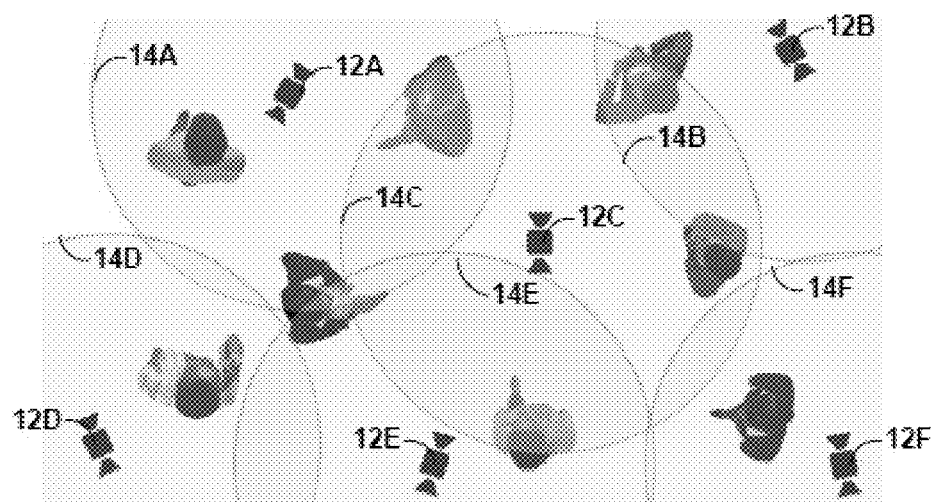
FIGS. 2A and 2B are conceptual diagrams illustrating a multi-camera image capturing system of FIG. 1.
Figure 2B:
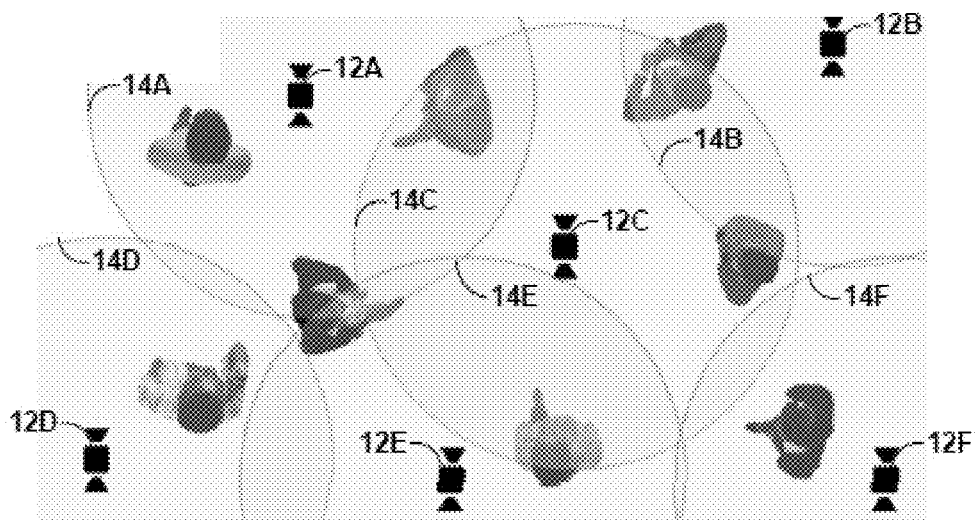

FIGS. 2A and 2B are conceptual diagrams illustrating a multi-camera image capturing system of FIG. 1. Like FIG. 1, FIGS. 2A and 2B illustrate examples where each one of camera devices 12 captures respective image contents 14. Unlike in FIG. 1, image contents 14 are illustrated as overlapping. As an example, image content 14A, 14C, and 14E overlap.

In FIG. 2A, camera devices 12A are illustrated in different orientations. Therefore, a viewer switching viewing images generated from one of camera devices 12 to another one of camera devices 12 may need to reorient to the orientation at which the one of camera devices 12 to which the viewer is switching.

FIG. 2B provides a conceptual illustration of the effective result of the techniques described in this disclosure. Although FIG. 2B illustrates camera devices 12 each having the same orientation, it should be understood that camera devices 12 need not all be oriented in the same direction. Rather, FIG. 2B is illustrating that when the techniques described in this disclosure are implemented, the result may be that the captured images from different camera devices 12 are all oriented to a common reference.

For example, in a multi-camera environment, the images generated by camera devices 12 may depend upon their physical orientation of camera devices 12. When transitioning image contents 14 from respective camera devices 12, the viewer may experience a disorienting effect. The techniques described in this disclosure may result in generating 360-degree images such that there is comfortable transition when switching camera devices 12. For instance, the result may be similar if camera devices 12 were all oriented to a common reference, as conceptually illustrated in FIG. 2B.

Figure 3:
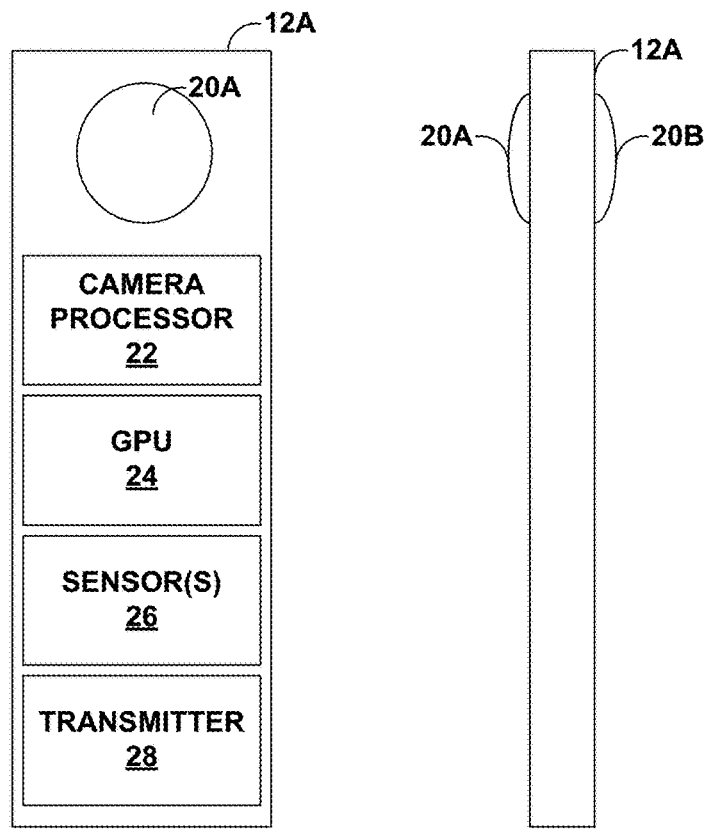
FIG. 3 is a block diagram illustrating an example camera device for capturing a 360-degree video or image in accordance with one or more example techniques described in this disclosure.

FIG. 3 is a block diagram illustrating an example camera device for capturing a 360-degree video in accordance with one or more example techniques described in this disclosure. As illustrated, camera device 12A is a video capture device that includes fisheye lens 20A and fisheye lens 20B located on opposite sides of camera device 12A to capture full a 360-degree video/image. Other orientations of fisheye lens 20A and 20B may be possible. For example, camera device 12A may include more than two fisheye lens, or a single 360-degree lens. Also, fisheye lenses are provided merely as one example, and other lens types are possible.

One example of camera device 12A may include 16 lenses (e.g., 16-camera array for filming 3D VR content). Another example of camera device 12A may include eight lenses, each with 195-degree angle of view (e.g., each lens captures 195 degrees of the 360 degrees of image content). Other example of camera device 12A include four or three lenses. Some examples may include a 360-degree lens that captures 360-degrees of image content.

The example techniques described in this disclosure are generally described with respect to camera devices 12A include two fisheye lenses capturing a 360-degree image/video. However, the example techniques are not so limited. The example techniques may be applicable to examples of camera device 12A that include a single 360-degree lens, a plurality of lenses (e.g., two or more) even if the lenses are not fisheye lenses, and a plurality of fisheye lenses.

As described above, the 360-degree video content may be considered as a sequence of 360-degree images (e.g., frames of the video). The example techniques described in this disclosure describe techniques related to the images, which can be used for purposes of still images (e.g., a 360-degree snapshot) or for images that form a video (e.g., a 360-degree video).

A user may interact with camera device 12A to capture the 360-degree video/image, where each one of fisheye lens 20A and 20B captures a portion of the 360-degree video/image, and the two video/image streams from the fisheye lens 20A and 20B are blended together to create the 360-degree video/image.

There may be various ways in which a user interacts with camera device 12A. As one example, the user may interact with camera device 12A with a push button located on camera device 12A. As another example, a user may interact with camera device 12A via a displayed interface (e.g., graphical user interface (GUI)).

In some examples, camera device 12A may provide no display. Rather, camera device 12A outputs the captured image that is then displayed by to another device (e.g., processing device 18).

As illustrated, camera device 12A includes camera processor 22, graphics processing unit (GPU) 24, one or more sensors 26, and transmitter 28. Although the various components are illustrated as separate components, in some examples the components may be combined to form a system on chip (SoC). As an example, camera processor 22 and GPU 24 may be formed on a common integrated circuit (IC) chip, or in separate IC chips. Various other permutations and combinations are possible, and the techniques should not be considered limited to the example illustrated in FIG. 3. Camera processor 22 and GPU 24 may be formed as fixed-functional and/or programmable circuitry such as in one or more microprocessors, application specific integrated circuits (ASICs), field programmable gate arrays (FPGAs), digital signal processors (DSPs), or other equivalent integrated or discrete logic circuitry.

Although camera device 12A is illustrated in FIG. 3, camera devices 12B-12N may include similar components. Also, camera device 12A need not necessarily include GPU 24 in all examples. For instance, in examples where camera device 12A transmits the circular images captured by fisheye lenses 20A and 20B, camera device 12A may not include GPU 24. However, it may be possible for camera device 12A to include GPU 24 even in examples where camera device 12A transmits the circular images.

Transmitter 28 may be configured to transmit image data captured by camera device 12A. For example, transmitter 28 may include circuitry to transmit, wirelessly or via a wired connection, circular images and/or projection images to server 16, to another computing device, or processing device 18.

Camera processor 22 is configured to receive the electrical currents as sensor signals from respective pixels of lens 20A and 20B and process the electrical currents to generate pixel data, e.g., R. G. B data, luma and chroma data, or the like, of respective fisheye images (e.g., circular images such as those illustrated in FIGS. 4A and 4B). Although one camera processor 22 is described, in some examples, there may be a plurality of camera processors (e.g., one for lens 20A and one for lens 20B).

In some examples, camera processor 22 may be configured as a single-input-multiple-data (SIMD) architecture. Camera processor 22 may perform the same operations on current received from each of the pixels on each of lens 20A and 20B. Each lane of the SIMD architecture may include an image pipeline. The image pipeline includes hardwire circuitry and/or programmable circuitry to process the output of the pixels.

For example, each image pipeline of camera processor 22 may include respective trans-impedance amplifiers (TIAs) to convert the current to a voltage and respective analog-to-digital converters (ADCs) that convert the analog voltage output into a digital value. The current outputted by each pixel indicates the intensity of a red, green, or blue component.

In addition to converting analog current outputs to digital values, camera processor 22 may perform some additional post-processing to increase the quality of the final image. For example, camera processor 22 may evaluate the color and brightness data of neighboring image pixels and perform demosaicing to update the color and brightness of the image pixel. Camera processor 22 may also perform noise reduction and image sharpening, as additional examples.

Camera processor 22 outputs the resulting images (e.g., pixel values for each of the image pixels) for GPU 24 to process. For example, GPU 24 may blend the pixel values to generate a projection image. For ease of description, the examples are described with respect to GPU 24 performing the operations. However, camera processor 22 or a GPU on processing device 18, server 16, or some other device may be configured to blend the captured images.

Figures 4A, 4B:
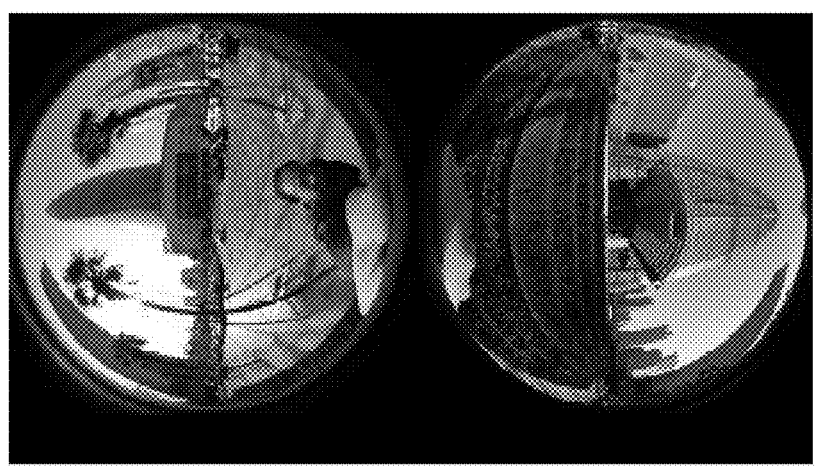
FIGS. 4A and 4B are pictorial diagrams illustrating images captured from the device of FIG. 3.

FIGS. 4A and 4B are pictorial diagrams illustrating an image captured from the device of FIG. 3. As illustrated, the output of the two images captured by lenses 20A and 20B are circular images (e.g., round images). For example, FIG. 4A represents the image captured by lens 20A, and FIG. 4B represents the image captured by lens 20B. Camera processor 22 receives the image content captured by lens 20A and 20B and processes the image content to generate FIGS. 4A and 4B. In some examples, FIGS. 4A and 4B may be part of a common image frame.

As illustrated, FIGS. 4A and 4B are circular images illustrating image content that appears bubble-like. If the two circular images are stitched together, the resulting image content would be for the entire sphere of image content (e.g., 360-degree of viewable content).

Referring back to FIG. 3, GPU 24 may be configured to generate projection images from the circular images generated by camera processor 22. Examples of the projection images include equirectangular, cubic, cylindrical, spherical, pierce-quincunical, etc. To generate the projection images, GPU 24 may texture map each circular image (e.g., each one of the images illustrated in FIGS. 4A and 4B) onto a projection (e.g., equirectangular projection, cubic projection, cylindrical projection, spherical projection, or pierce-quincunical projection).

For example, for an equirectangular projection, there is a two-dimensional rectangular structure. GPU 24 takes one pixel from a circular image and maps pixel values for that pixel onto a location on the rectangular structure. GPU 24 repeats these steps for each pixel in the circular image, and maps that pixel to the rectangular structure, in a process referred to as texture mapping. The circular image is considered to be a color texture, and the pixels of the circular image are referred to as texels in texture mapping.

The result of the texture mapping of a first circular image to a first rectangular structure is a first intermediate image. GPU 24 may repeat this process, but with respect to a second circular image to generate a second intermediate image (e.g., texture map the second circular image to a rectangular structure). GPU 24 may then stitch together the two intermediate images to generate the projection image. As an example, a blender circuit of GPU 24 may blend pixel values of pixels on a bottom border of the first intermediate image with pixels on a top border of the second intermediate image, resulting in an equirectangular image.

GPU 24 may repeat these operations for a plurality of circular images captured by lenses 20A and 20B to generate a set of images (e.g., a set of equirectangular images). In this example, the set of equirectangular images includes the content of image content 14A.

For pierce-quincunical, GPU 24 may perform similar operations. For example, for pierce-quincunical, there may also be a two-dimensional rectangular structure to which GPU 24 texture maps the circular images. However, the location on the two-dimensional structure to where GPU 24 would map a pixel of a circular image for pierce-quincunical images is different than the location of the two-dimensional structure to where GPU 24 would map a pixel of a circular image for equirectangular images. For the cubic, cylindrical, and spherical projections, GPU 24 may perform similar operations, but texture map to a three-dimensional structure (e.g., cube, cylinder, or sphere).

As described above, one possible issue may be that each of the projection images (e.g., equirectangular images or pierce-quincunical images) from different ones of camera devices 12 may not be oriented to a same orientation reference (e.g., positional relative to azimuth, amplitude, or rotational angle or position of scene or viewer gaze/head). Then, when processing device 18 switches between image contents 14 (e.g., image contents 14A to 14B), the viewer may need to reorient so that the image content 14B is oriented the same to how image content 14A was oriented.

In examples described in this disclosure, camera device 12A includes one or more sensors 26 (e.g., magnetometer sensor, inertia-measurement unit (IMU), or gyroscope) to orient the projection images to a common orientation reference. The other camera devices 12 may include similar one or more sensors 26.

As an example, after GPU 24 generates the projection image, GPU 24 may receive information indicating the alignment of a particular geographical direction. GPU 24 may then adjust the projection image such that the geographical direction alignment is to a particular coordinate point on the projection image.

In general, GPU 24 may shift, rotate, shear, or distort the projection image to adjust the projection image to the align to the particular geographical direction. For instance, to rotate the projection image 90-degrees, GPU 24 may set the x-coordinate value of a pixel on the projection image to the y-coordinate on the adjusted projection image, and set the y-coordinate value of a pixel on the projection image to the x-coordinate on the adjusted projection image.

As another example, GPU 24 may perform another texture mapping pass. In this texture mapping pass, the projection image forms the texture, and GPU 24 texture maps a pixel from the projection image onto a structure having a similar shape as the projection image, but at different locations onto this structure (e.g., shifts each pixel of the projection image by 45-degrees onto this structure to generate an adjusted projection image that is rotated 45-degrees).

Other ways to adjust the projection image are possible and the above techniques should not be considered limiting. For example, rather than generating the projection image and then adjusting the projection image, GPU 24 may texture map the pixels of the circular images to their final, correct locations such that the projection image is oriented to a common orientation reference (e.g., aligned based on a geographical direction) as part of the texture mapping.)

For equirectangular and cylindrical projections, GPU 24 may perform a horizontal shift of pixels with wrap-around in order to align to the common orientation reference. A spherical transformation and rotation may also be performed by GPU 24. For the cubic projection, GPU 24 may use the information from one or more sensors 26 to render the six sides of cube. For the peirce-quincuncial, GPU 24 may integrate the information from one or more sensors 26 into the Peirce/Pierpont formula described in "Elucidating Peirce Quincuncial Projection," by Puentes et al., the contents of which are incorporated by reference in their entirety.

Figure 5A:
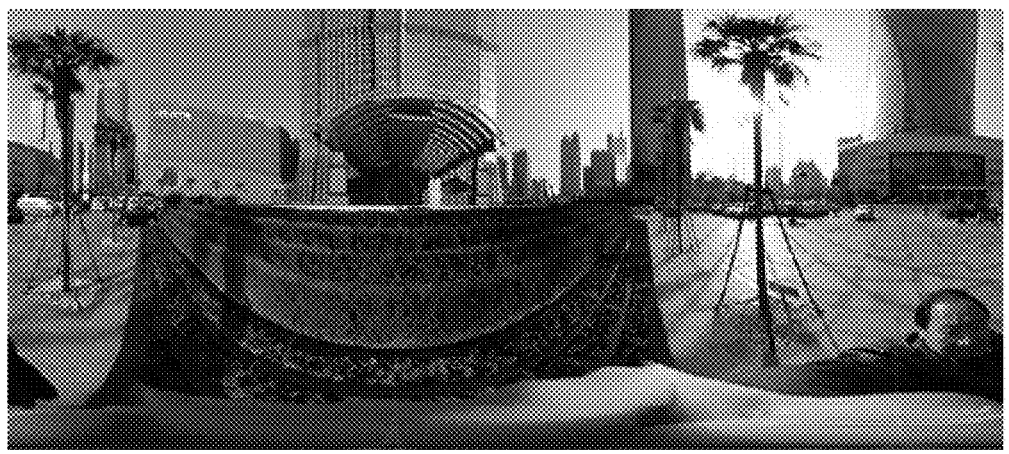
FIG. 5A is a pictorial diagram illustrating an image generated without orientation to an orientation reference.

FIG. 5A is a pictorial diagram illustrating an image generated without orientation to an orientation reference. For example, FIG. 5A illustrates an example where GPU 24 generated an equirectangular image based on the angle of lenses 20A and 20B. If each one of camera devices 12 generated similar equirectangular images, then switching from one of image contents 14 to another one of image contents 14 may result in requiring viewer reorientation within the displayed 360-degree view volume.

Figure 5B:
FIG. 5B is a pictorial diagram illustrating an image generated with orientation to an orientation reference.

FIG. 5B is a pictorial diagram illustrating an image generated with orientation to an orientation reference. In FIG. 5B, GPU 24 adjusted the projection image illustrated in FIG. 5A such that top-center coordinate in the adjusted projection image is aligned North. Based on measurements from one or more sensors 26, GPU 24 may determine where North is located in the projection image illustrated in FIG. 5A. GPU 24 may then adjust the projection image of FIG. 5A so that North is aligned to the top-center coordinate, as illustrated in FIG. 5B.

In some examples, aligning to a geographical direction may provide a first level of adjustment (e.g., in a first dimension). GPU 24 may perform a second level of adjustment on the adjusted projection image to generate another adjusted projection image. One or more sensors 26 may include a gyroscope or an IMU. GPU 24 may use the information generated from the gyroscope or the IMU to further adjust the tilt to a common orientation reference. Also, one or more sensors 26 may be used to further adjust the rotational angle to a common orientation reference.

Figure 6C:
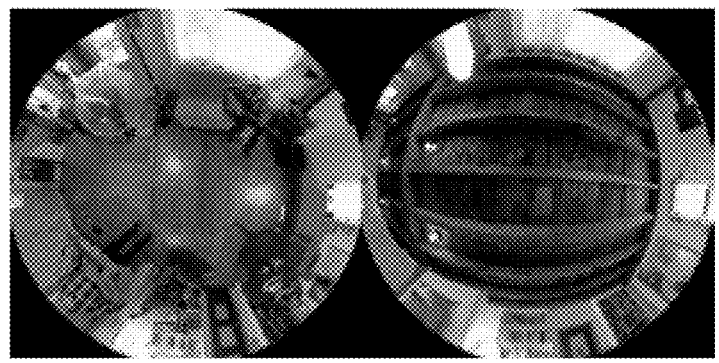
FIG. 6C is a pictorial diagram illustrating an image generated from images of FIGS. 6A and 6B oriented with orientation to an orientation reference.

FIGS. 6A and 6B are pictorial diagrams illustrating images captured from the device of FIG. 1. For instance, FIGS. 6A and 6B are similar to those of FIGS. 4A and 4B, but with different content. FIG. 6C is a pictorial diagram illustrating an image generated from images of FIGS. 6A and 6B oriented with orientation to an orientation reference. For instance, FIG. 6C illustrates an example of a pierce-quincunical projection image. In this example, rather than aligning North to the top-center of the projection image, GPU 24 may align North to the top-right corner of the projection image.

Although the above examples are described with respect to GPU 24 of camera device 12A performing the example techniques, aspects of this disclosure are not so limited. For instance, transmitter 28 may transmit image data for circular images (e.g., images such as those of FIGS. 4A, 4B, 6A, and 6B) to server 16, some other computing device, or processing device 18. In addition, transmitter 28 may output directional information, tilt information, and/or rotational angle information to these other devices. A GPU on these other devices may then generate a projection image that is oriented to an orientation reference, such as those illustrated in FIGS. 5B and 6C, and then transmit it back to some other device, as an example.

Figure 7:
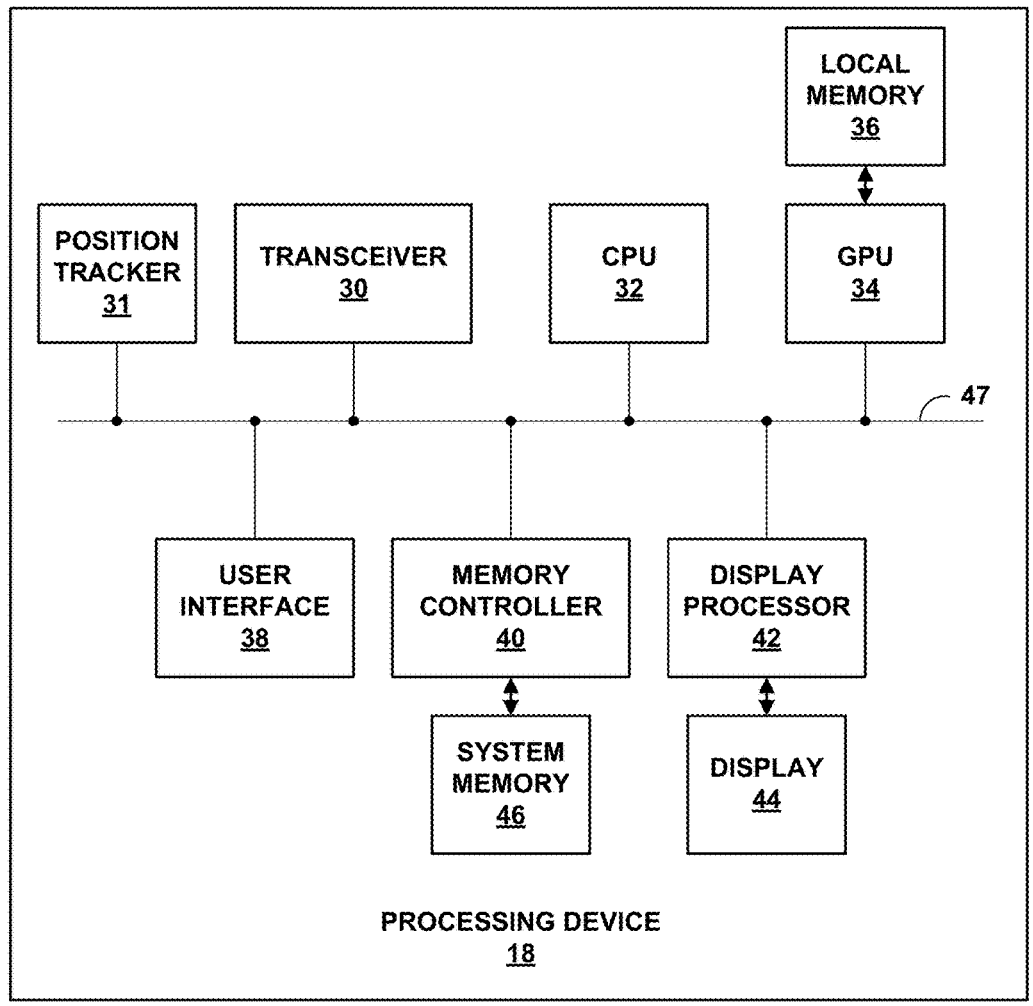
FIG. 7 is a block diagram of a device configured to perform one or more of the example techniques described in this disclosure.

FIG. 7 is a block diagram of a processing device of FIG. 1 configured to perform one or more of the example techniques described in this disclosure. Examples of processing device 18 of FIG. 7 include personal computer, a desktop computer, a laptop computer, a tablet computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a camera, a television, a television set-top box, a server, an intermediate network device, a mainframe computer or any other type of device that processes and/or displays graphical data.

As illustrated in the example of FIG. 7, processing device 18 includes transceiver 30, position tracker 31, central processing unit (CPU) 32, a graphical processing unit (GPU) 34 and local memory 36 of GPU 34, user interface 38, memory controller 40 that provides access to system memory 46, and display processor 42 that outputs signals that cause graphical data to be displayed on display 44.

Also, although the various components are illustrated as separate components, in some examples the components may be combined to form a system on chip (SoC). As an example, CPU 32, GPU 34, and display processor 42 may be formed on a common integrated circuit (IC) chip. In some examples, one or more of CPU 32, GPU 34, and display processor 42 may be in separate IC chips. Various other permutations and combinations are possible, and the techniques should not be considered limited to the example illustrated in FIG. 7.

The various components illustrated in FIG. 7 (whether formed on one device or different devices) may be formed as fixed-functional and/or programmable circuitry, or a combination of such circuitry, such as in one or more microprocessors, application specific integrated circuits (ASICs), field programmable gate arrays (FPGAs), digital signal processors (DSPs), or other equivalent integrated or discrete logic circuitry. Examples of local memory 36 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 7 communicate with each other using bus 47. Bus 47 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXensible Interface (AXI) bus) or another type of bus or device interconnect. It should be noted that the specific configuration of buses and communication interfaces between the different components shown in FIG. 7 is merely exemplary, and other configurations of computing devices and/or other image processing systems with the same or different components may be used to implement the techniques of this disclosure.

CPU 32 may comprise a general-purpose or a special-purpose processor that controls operation of processing device 18. A user may provide input to processing device 18 to cause CPU 32 to execute one or more software applications. The software applications that execute on CPU 32 may include, for example, a word processor application, a web browser application, an email application, a photo viewing application, a photo editing application, a graphics editing application, a spread sheet application, a media player application, a video game application, a graphical user interface application or another program. The user may provide input to processing device 18 via one or more input devices (not shown) such as a keyboard, a mouse, a microphone, a touch pad or another input device that is coupled to processing device 18 via user input interface 38.

One example of the software application is the viewing application. CPU 32 executes the viewing application to view image contents 14 captured by camera devices 12. For example, in response to executing the viewing application, CPU 32 may output a command to transceiver 30 to retrieve circular images, projection images, or both from server 16 or camera devices 12. Transceiver 30 may form a wireless or wired connection with server 16 in response and download the circular images and/or projection images for image contents 14 from server 16.

In some examples, CPU 32 may cause transceiver 30 to download circular images and/or projection images for a particular one of image contents 14. In some examples, CPU 32 may cause transceiver 30 to download circular images and/or projection images for a plurality of or all of image contents 14. In response, transceiver 30 may download the circular images and/or projection images from the instructed ones of image contents 14, and store the circular images and/or projection images as sets of images from respective ones of camera devices 12 in system memory 46 via memory controller 40.

The viewing application that executes on CPU 32 may include one or more graphics rendering instructions that instruct CPU 32 to cause the rendering of graphics data to display 44. In some examples, the instructions of the viewing application may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As one example, the user may execute the viewing application to have transceiver download the circular images and/or projection images for storage in system memory 46. After storage, the viewing application may cause CPU 32 to instruct GPU 34 to render for display the circular images and/or projection images. The viewing application may use software instructions that conform to an example API, such as the OpenGL API, to instruct GPU 34 to render for display the images (e.g., circular images and/or projection images).

In response to the received instructions. GPU 34 may receive the image content of the circular images and/or projection images and render the images to generate the 360-degree video. Display 44 displays the 360-degree video. The user may interact with user interface 38 to modify the viewing perspective so that the viewer can view the full 360-degree video (e.g., view above, behind, in front, and all angles of the 360 sphere).

The viewer may also interact with user interface 38 to move through the viewing volume of the 360-degree video. For instance, the viewer may interact with user interface 38 to move forward, backward, leftward, rightward, upward, or downward in the viewing volume of the 360-degree video. As an example, in the house setting, the viewer may perceive as if he or she is moving through a hallway in the house. In the wedding setting, the viewer may perceive as if he or she is moving from one table to another table at the reception.

Memory controller 40 facilitates the transfer of data going into and out of system memory 46. For example, memory controller 40 may receive memory read and write commands, and service such commands with respect to memory 46 in order to provide memory services for the components in processing device 18. Memory controller 40 is communicatively coupled to system memory 46. Although memory controller 40 is illustrated in the example of processing device 18 of FIG. 7 as being a processing circuit that is separate from both CPU 32 and system memory 46, in other examples, some or all of the functionality of memory controller 40 may be implemented on one or both of CPU 32 and system memory 46.

System memory 46 may store program modules and/or instructions and/or data that are accessible by CPU 32 and GPU 34. For example, system memory 46 may store user applications (e.g., instructions for the viewing application), resulting images from camera devices 12, etc. System memory 46 may additionally store information for use by and/or generated by other components of processing device 18. System memory 46 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 46 may include instructions that cause CPU 32 and GPU 34, and display processor 42 to perform the functions ascribed to these components in this disclosure. Accordingly, system memory 46 may be a computer-readable storage medium having instructions stored thereon that, when executed, cause one or more processors (e.g., CPU 32, GPU 34, and display processor 42) to perform various functions.

In some examples, system memory 46 is a non-transitory storage medium. The term "non-transitory" indicates that the storage medium is not embodied in a carrier wave or a propagated signal. However, the term "non-transitory" should not be interpreted to mean that system memory 46 is non-movable or that its contents are static. As one example, system memory 46 may be removed from device 18, and moved to another device. As another example, memory, substantially similar to system memory 46, may be inserted into device 18. In certain examples, a non-transitory storage medium may store data that can, over time, change (e.g., in RAM).

CPU 32 and GPU 34 may store image data, and the like in respective buffers that are allocated within system memory 46. Display processor 42 may retrieve the data from system memory 46 and configure display 44 to display the image represented by the generated image data. In some examples, display processor 42 may include a digital-to-analog converter (DAC) that is configured to convert the digital values retrieved from system memory 46 into an analog signal consumable by display 44. In other examples, display processor 42 may pass the digital values directly to display 44 for processing.

Display 44 may include a monitor, a television, a projection device, a liquid crystal display (LCD), a plasma display panel, a light emitting diode (LED) array such as an organic light emitting diode (OLED) display, a cathode ray tube (CRT) display, electronic paper, a surface-conduction electron-emitted display (SED), a laser television display, a nanocrystal display or another type of display unit. Display 44 may be integrated within processing device 18. For instance, display 44 may be a screen of a mobile telephone handset or a tablet computer. Alternatively, display 44 may be a stand-alone device coupled to processing device 18 via a wired or wireless communications link. For instance, display 44 may be a computer monitor or flat panel display connected to a personal computer via a cable or wireless link.

In examples where processing device 18 receives circular images, GPU 34 may be configured to generate the projection images based on similar operations like those described above with respect to GPU 24. For example, GPU 34 may texture map the circular images to generate an equirectangular projection image or a pierce-quincunical projection image, and similar operations for the cubic, cylindrical, or spherical projection images.

For example, GPU 34 may receive (e.g., from system memory 46) a first set of images generated from camera device 12A that is in a first location. These first set of images may be circular images and/or projection images. In examples where the first set of images are circular images, GPU 34 may perform operations similar to those described above with respect to GPU 24 to generate the projection images, and store the projection images in system memory 46. In addition, GPU 34 may receive information gathered from one or more sensors 26. Camera devices 12 may transmit information gathered from respective one or more sensors 26 to server 16 from which transceiver 30 receives the gathered information for storage in system memory 46, and GPU 34 receives the gathered information from system memory 46. GPU 34 may use the information gathered from one or more sensors 26 to adjust the orientation of the projection image.

In some examples, position tracker 31 may be configured to track the position of the viewer eyes (e.g., gaze) or head, and output information indicative of the position of the viewer eyes or head to CPU 32. In turn, CPU 32, in providing instructions to GPU 34 to render image contents 14, may provide information indicating the position of the viewer eyes or head. In rendering image content 14B, GPU 34 may position image content 14B such that the viewer does not change a position of his or her eyes or head position. For example, when transitioning from a rendered first set of images from image content 14A captured by camera device 12A to a second set of images from image content 14B captured by camera devices 12B, GPU 34 may render the second set of images to a common reference (e.g., the position of viewer eye or head) as the rendered first set of images.

In some examples, CPU 32 may determine commonality between image content 14A and image content 14B. CPU 32 may instruct GPU 34 to render image content 14B such that the common content is displayed at the same location on display 44. For example, to render image content 14B, CPU 32 may instruct GPU 34 to render scene content common to both image content 14A in a first set of images and image content 14B in a second set of images such that the common scene content is displayed in the rendered second set of images for image content 14B in same location as location of the common scene content in the rendered first set of images for image content 14A. In this way, in transitioning from a rendered first set of images from image content 14A captured by camera device 12A to a second set of images from image content 14B captured by camera devices 12B, GPU 34 may render the second set of images to a common reference (e.g., common scene) as the rendered first set of images.

In examples where the first set of images are projection images, the projection images may already have been oriented to the orientation reference. In such cases, GPU 34 may not need to further adjust. However, in some examples, the first set of images may be projection image, but the projection image may not have been oriented to the orientation reference. In such examples, GPU 34 may adjust the orientation of the projection images to the common orientation reference.

Similarly, GPU 34 may receive (e.g., from system memory 46) a second, different set of images generated from camera device 12B that is in a second, different location. These second set of images may be circular images and/or projection images. GPU 34 may perform similar operations as described above with respect to first set of images to generate projection images having the orientation reference (e.g., the same orientation as the orientation reference for the rendered first set of images).

GPU 34 may not be adjusting the orientation for both the first set of images and the second set of images at the same time; although such parallel adjustment of orientation is possible. CPU 32 may instruct GPU 34 which one of image contents 14 is to be rendered for display. As an example, CPU 32 may instruct GPU 34 that circular images and/or projection images from image content 14A captured by camera device 12A are to be rendered for display. In this example, GPU 34 may adjust orientation for the first set of images (if needed) to the orientation reference.

Then, when CPU 32 instructs GPU 34 that circular images and/or projection images from image content 14B captured by camera device 12B are to be rendered for display, GPU 34 may adjust orientation for the second set of images (if needed) to the orientation reference (e.g., same orientation reference as the rendered first set of images). For instance, GPU 34 may adjust orientation of first set of images so that the rendered first set of images have an orientation reference, and adjust orientation of second set of images so that the rendered second set of images have the orientation reference (e.g., same orientation reference as the rendered first set of images). As described above, GPU 34 may not need to adjust the orientation of the first and second sets of images such as in cases where the received projection images for image content 14A and 14B had already been oriented to the common orientation reference (e.g., by camera devices 12A and 12B, server 16, or some other device).

In any event, once system memory 46 stores the projections images for the first set of images. GPU 34 may render for display the first set of images oriented to an orientation reference. Then, when GPU 34 switches to the second set of images (e.g., because viewer interacted with user interface 38 to enter area covered by image contents 14B), GPU 34 may render for display the second set of images oriented to the orientation reference (e.g., same orientation reference as the orientation reference for the rendered first set of images). In this way, the viewer may not perceive a jarring experience in switching from image content 14A to image content 14B. For instance, rendering for display the second set of images includes switching for display of the rendered first set of images to rendering for display the second set of images.

In example techniques described in this disclosure, GPU 34 includes a graphics processing pipeline that includes processing circuitry (e.g., programmable circuitry and/or fixed-function circuitry) for rendering for display the different sets of images from different ones of camera devices 12. For example, GPU 34 may include texture hardware circuitry used for performing the operations of the example techniques. GPU 34 may also include processing circuitry for the blending for performing the operations of the example techniques.

For instance, GPU 34 may use texture mapping to map the projection images onto a spherical mesh model. The spherical mesh model may include a plurality of primitives (e.g., points, lines, triangles, squares, or other polygons), each primitive having one or more vertices. The interconnection of the primitives forms a mesh model of a sphere. GPU 34 may use texture mapping to map the projection images for the first of images onto the spherical mesh model, and render the spherical mesh model to generate viewable 360-degree image content.

To perform the texture mapping, GPU 34 may map a pixel from the projection image onto the three-dimensional vertices (e.g., each vertex has an x, y, and z coordinate) of the spherical mesh model. The result may be a sphere having the content of the projection image. As an illustration, imagine a two-dimensional world map being mapped on to a sphere to form a globe. GPU 34 may then render this sphere to generate the viewable 360-degree images.

GPU 34 may output the result of the rendering to system memory 46. Display processor 42 may retrieve the image content from system memory 46 and display the resulting 360-degree image on display 44. In some examples, display 44 may display a portion of the entire sphere, and the viewer may interface with device 18 (e.g., via display 44 or user interface 38) to select which portion of the sphere to view.

In this way, GPU 34 may render for display the first set of images oriented to an orientation reference, and render for display the second set of images oriented to the same orientation reference as the orientation reference for the rendered first set of images. As described above, GPU 34 need not render for display the first set of images and the second set of images at the same time, but may switch from display of the rendered first set of images to rendering for display the second set of images. However, the first set of images and second set of image may be generated at the same time from different ones of camera devices 12.

In some examples, the orientation reference is a geographical direction, where the geographical direction is based on a compass measurement (e.g., from one or more sensors 26). For instance, GPU 34 may render for display the first set of images such that image content located in a first geographical direction relative to camera device 12A is located at a first coordinate within rendered images of the first set of images (e.g., North is aligned to the top-center coordinate). GPU 34 may render for display the second set of images such that image content located in a second geographical direction relative to camera device 12B is located at a second coordinate within rendered images of the second set of images. In this example, the first geographical direction and the second geographical direction is the same geographical direction (e.g., aligned North), and the first coordinate and the second coordinate is the same coordinate (e.g., top-center coordinate as illustrated in FIG. 5B or top-right coordinate as illustrated in FIG. 6C).

GPU 34 may receive the first set of images and the second set of images already oriented to the same orientation reference. In some examples, GPU 34 may receive information indicative of the orientation reference relative to the first set of images, and receive information indicative of the orientation reference relative to the second set of images. GPU 34 may adjust the orientation of the first and second sets of images based on the information indicative of the orientation reference relative to the first and second sets of images. In such examples, GPU 34 may render for display the first and second sets of images having the adjusted orientation.

Furthermore, in some examples, GPU 34 may render for display the first and second set of images to two different orientation references (e.g., geographical directional alignment and tilt alignment) or three different orientation references (e.g., geographical directional alignment (azimuth), tilt alignment (altitude), and rotational angle). For example, GPU 34 may render for display the first set of images oriented to a first orientation reference (e.g., geographical directional alignment) and a second orientation reference (e.g., tilt alignment), and/or a third orientation (e.g., rotational angle). GPU 34 may also render for display the second set of images oriented to the first orientation and the same second orientation reference as the second orientation reference for the first set of images, and the same third orientation reference as the third orientation reference for the first set of images.

In some examples, GPU 34 may render for display the second set of images for scene content common to both the first set of images and the second set of images being displayed in a substantially same location. For example, GPU 34 may render scene content common to both the first set of images and the second set of images such that the common scene content is displayed in the rendered second set of images in same location as location of the common scene content in the rendered first set of images. In some examples, GPU 34 may render for display the second set of images based on a position of a viewer gaze or head when the viewer was viewing the first set of images (e.g., select the orientation reference based on viewer gaze or head position).

Figure 6C:
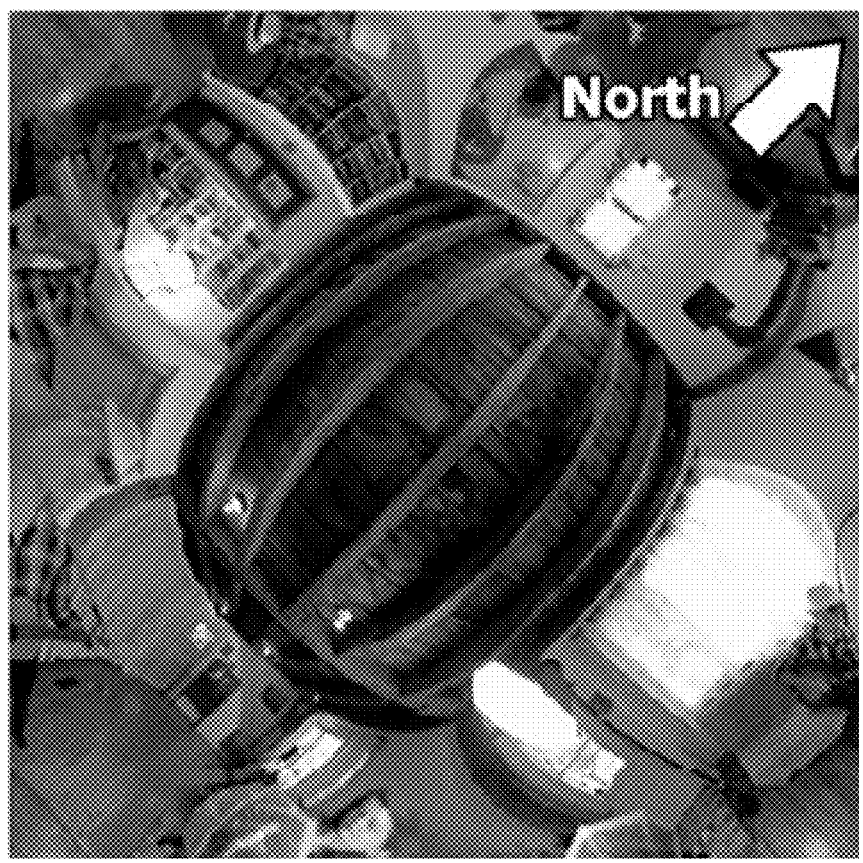
Figure 8:
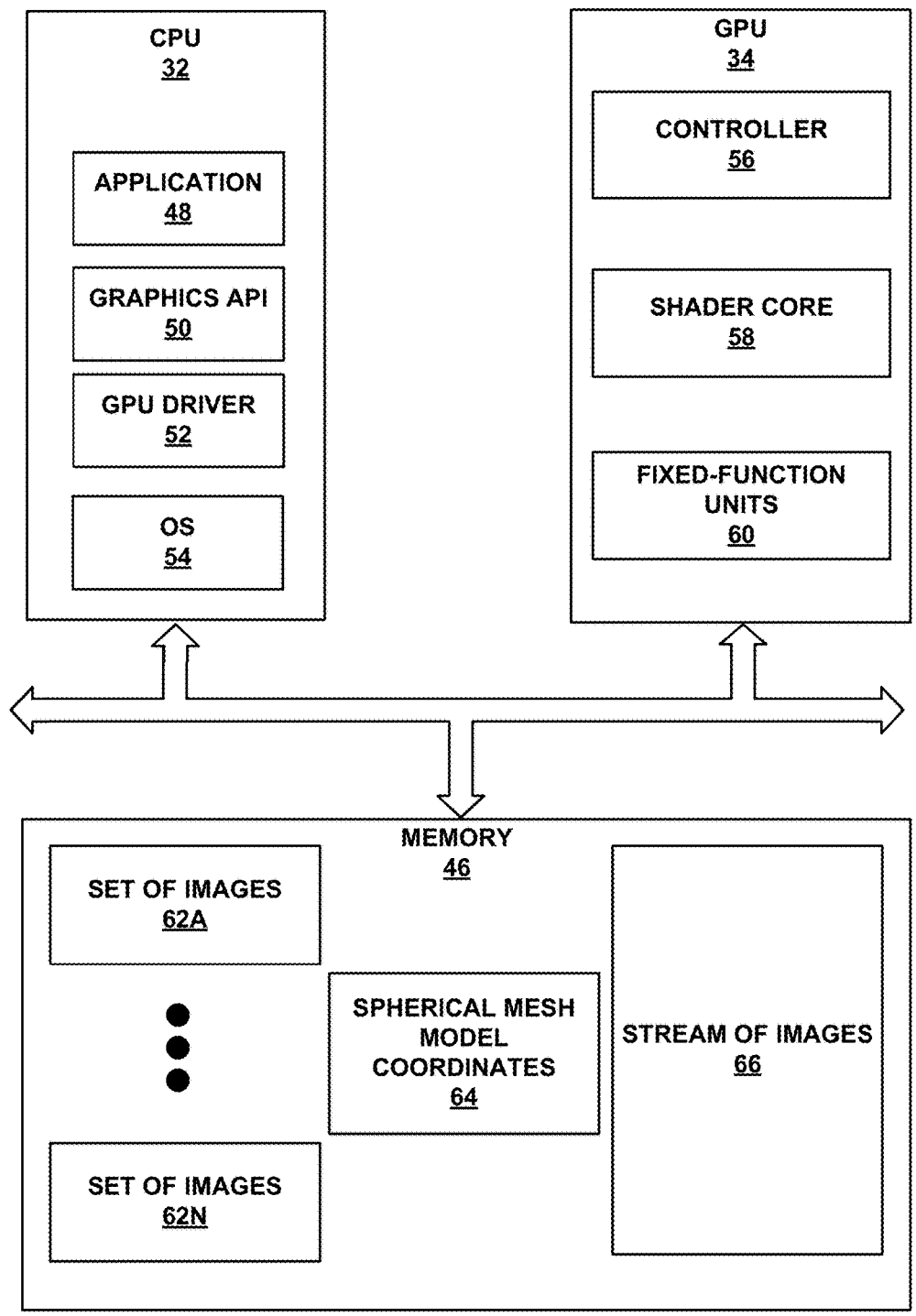
FIG. 8 is a block diagram illustrating a CPU, a GPU and a memory of the device of FIG. 7 in further detail.

FIG. 8 is a block diagram illustrating CPU 32, GPU 34, and system memory 46 of processing device 18 of FIG. 6 in further detail. As shown in FIG. 8, CPU 32 is communicatively coupled to GPU 34 and memory 46, and GPU 34 is communicatively coupled to CPU 32 and memory 46. GPU 34 may, in some examples, be integrated onto a motherboard with CPU 32. In additional examples, GPU 34 may be implemented on a graphics card that is installed in a port of a motherboard that includes CPU 32. In further examples, GPU 34 may be incorporated within a peripheral device that is configured to interoperate with CPU 32. In additional examples, GPU 34 may be located on the same processing circuitry as CPU 32 forming a system on a chip (SoC).

CPU 32 is configured to execute application 48, a graphics API 50, a GPU driver 52, and an operating system 54. GPU 34 includes a controller 56, shader core 58, and one or more fixed-function units 60.

Viewing application 48 may include at least some of one or more instructions that cause graphic content to be displayed or one or more instructions that cause a non-graphics task (e.g., a general-purpose computing task) to be performed on GPU 34. As an example, viewing application 48 may be cause CPU 32 to cause GPU 34 to render the 360-degree video or images for display. Viewing application 48 may issue instructions to graphics API 50. Graphics API 50 may be a runtime service that translates the instructions received from software application 48 into a format that is consumable by GPU driver 52. In some examples, graphics API 50 and GPU driver 52 may be part of the same software service.

GPU driver 52 receives the instructions from viewing application 48, via graphics API 50, and controls the operation of GPU 34 to service the instructions. For example, GPU driver 52 may formulate one or more command streams, place the command streams into memory 46, and instruct GPU 34 to execute command streams. GPU driver 52 may place the command streams into memory 46 and communicate with GPU 34 via operating system 54 (e.g., via one or more system calls).

Controller 56 of GPU 34 is configured to retrieve the commands stored in the command streams, and dispatch the commands for execution on shader core 58 and one or more fixed-function units 60. Controller 56 may dispatch commands from a command stream for execution on one or more fixed-function units 60 or a subset of shader core 58 and one or more fixed-function units 60. Controller 56 may be hardware, fixed-function circuitry of GPU 34, may be programmable circuitry of GPU 34 for executing software or firmware, or a combination of both.

Shader core 58 includes programmable circuitry (e.g., processing cores on which software executes). One or more fixed-function units 60 include fixed function circuitry configured to perform limited operations with minimal functional flexibility. Shader core 58 and one or more fixed-function units 60 together form a graphics pipeline configured to perform graphics processing.

Shader core 58 may be configured to execute one or more shader programs that are downloaded onto GPU 34 from CPU 32. A shader program, in some examples, may be a compiled version of a program written in a high-level shading language (e.g., an OpenGL Shading Language (GLSL), a High Level Shading Language (HLSL), a C for Graphics (Cg) shading language, etc). In some examples, shader core 58 may include a plurality of processing units that are configured to operate in parallel (e.g., a SIMD pipeline). Shader core 58 may have a program memory that stores shader program instructions and an execution state register (e.g., a program counter register) that indicates the current instruction in the program memory being executed or the next instruction to be fetched. Examples of shader programs that execute on shader core 58 include, for example, vertex shaders, pixel shaders (also referred to as fragment shaders), geometry shaders, hull shaders, domain shaders, compute shaders, and/or unified shaders.

Fixed-function units 60 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 60 may include, for example, processing units that perform raster operations (e.g., depth testing, scissors testing, alpha blending, etc.).

GPU driver 52 of CPU 32 may be configured to write the command streams to memory 46, and controller 56 of GPU 34 may be configured to read the one or more commands of command streams from memory 46. In some examples, one or both of command streams may be stored as a ring buffer in memory 46. A ring buffer may be a buffer with a circular addressing scheme where CPU 32 and GPU 34 maintain synchronized state variables associated with the writing of data to and reading of data from the ring buffer. For example, if the first command stream is a ring buffer, each of CPU 32 and GPU 34 may store a write pointer indicating the next address to be written to in the ring buffer, and a read pointer indicating the next address to be read from in the ring buffer.

When CPU 32 writes a new command to the ring buffer, CPU 32 may update the write pointer in CPU 32 and instruct GPU 34 to update the write pointer in GPU 34. Similarly, when GPU 34 reads a new command from the ring buffer, GPU 34 may update the read pointer in GPU 34 and instruct CPU 32 to update the read pointer in CPU 32. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 52 and an example GPU controller 56 is now be described with respect to FIG. 8. GPU driver 52 receives one or more instructions from viewing application 48 that specify graphics operations and/or general-purpose computing operations to be performed by GPU 34. GPU driver 52 places the output command stream into memory 46, which is accessible by GPU controller 56. GPU driver 52 notifies GPU controller 56 that the command stream corresponding to viewing application 48 is available for processing. For example, GPU driver 52 may write to a GPU register (e.g., a GPU hardware register polled by GPU 34 and/or a GPU memory-mapped register polled by GPU 34) one or more values indicating that the command stream is ready for execution.

Upon notification that the command stream is ready for execution, controller 56 of GPU 34 may determine if resources are currently available on GPU 34 to begin executing the command stream. If resources are available, controller 56 begins to dispatch the commands in the command stream.

As part of graphics processing, CPU 32 may offload certain graphics processing tasks to GPU 34. For instance, application 48 may generate vertex coordinates for primitives the spherical mesh model, and store those coordinates as spherical mesh model coordinates 64 in memory 46. Additionally, application 48 may store sets of the images that processing device 18 receives from server 16. For example, application 48 may store sets of images 62A-62N, each for image contents 14 generated from respective ones of camera devices 12. In some examples, application 48 need not store all of sets of images 62A-62N at the same time; although such storage is possible. Application 48 may store the sets of images for image contents 14 that GPU 34 is to render for display.

GPU driver 52 may instruct controller 56 to retrieve one of sets of images 62A-62N for rendering for display. In examples where GPU 34 is to generate the projection images or adjust the orientations of the projection images, GPU driver 52 may instruct controller 56 to retrieve one of sets of images 62A-62N for generation of the projection images and/or adjustment of the orientation of the projection images to the common orientation reference.

If needed, GPU driver 52 may instruct controller 56 to cause texture mapping hardware, which is an example of fixed-function units 60, to perform the texture mapping to generate the projection images from the circular images based on the operations described above. Also, if needed, GPU driver 52 may instruct controller 56 to cause shader core 58 to execute a vertex shader and/or pixel shader developed for adjusting the projection images to the common orientation reference.

For example, viewing application 48 may divide the projection image into a plurality of primitives. The vertex shader, executing on shader core 58, may adjust the vertex coordinates of the primitives to adjust the orientation of the projection image to the common orientation reference. For instance, the vertex shader may receive a multiplication matrix, defined by viewing application 48, that values that each vertex of the projection image is to be multiplied by to generate new vertices that align the projection image to common orientation reference. In examples where the projection images are already properly oriented to the common orientation reference, this operation by the vertex shader may not be needed.

GPU driver 52 may instruct controller 56 to dispatch commands to the texture mapping hardware of fixed-function units 60 to perform the texture mapping to map the projection images to the spherical mesh model. To perform texture mapping, GPU driver 52 may indicate to GPU 34 which coordinates of the projection images correspond to which ones of spherical mesh model coordinates 64. One example way to indicate such correspondence is through the vertex shader that is to execute on the circuitry of shader core 58. The function of a vertex shader is to perform processing on vertices of the spherical mesh model. To perform such processing, application 48, via graphics API 50 and GPU driver 52, instructs controller 56 to retrieve batches of vertex coordinates (e.g., vertex coordinates for a primitive of the spherical mesh model stored as spherical mesh model coordinates 64) from memory 46. In addition, application 48, via graphics API 50 and GPU driver 52, may instruct controller 56 to retrieve coordinates for the projection images (e.g., one of sets of images 62A-62N).

Controller 56 may provide the x, y, z coordinates of the vertex coordinates for a primitive of the spherical mesh model and the s, t coordinates of the coordinates of the projection image for a corresponding primitive to the vertex shader as input for processing. In addition, application 48, via graphics API 50 and GPU driver 52, instructs a texture hardware circuit, which is an example of fixed-function units 60, to retrieve a primitive of the projection image and store the primitive in local memory 36 (local memory 36 is illustrated in FIG. 7).

Application 48, via graphics API 50 and GPU driver 52, may issue commands to the texture hardware circuit instructing the texture hardware circuit to overlay the primitive of the projection image onto the spherical mesh model primitive. Texture hardware circuit may stretch or otherwise resize, as instructed by application 48, the primitive of the projection image so that primitive of the projection image fits within the primitive of the spherical mesh model (e.g., via interpolation, filtering, and other mathematical operations to scale the texture primitive). The texture hardware circuit may assign the vertex attributes (e.g., color and opacity values) to the vertices of the spherical mesh model based on the vertex attributes of the primitives of the projection image.

Fixed-function units 60 of GPU 34 may rasterize the output from the vertex shader, and output the rasterized primitive to a pixel shader. Application 48, via graphics API 50 and GPU driver 52, may cause controller 56 of GPU 34 to execute the pixel shader (also called fragment shader) on the circuitry of shader core 58. The pixel shader may assign the pixel values from the primitive of the projection image to the corresponding pixels in the rasterized primitive to render for display the 360-degree image content. CPU 32 and GPU 34 may repeat these steps for all of the primitives of the spherical mesh model and the primitives of the projection image.

The result from rendering for display the projection images is stream of images 66 that GPU 34 stores in memory 46. Display processor 42 retrieves stream of images 66 and process the stream of images for display 44 to consume. When the viewer interacts with user interface 38 to move in the 360-degree image content, CPU 32 may cause GPU 34 to stop the rendering of one of set of images 62A-62N and begin the rendering of another one of set of images 62A-62N. CPU 32 and GPU 34 may repeat the above example operations on the new set of images 62A-62N. GPU 34 may then add on the resulting 360-degree image content from the new set of images 62A-62N onto stream of images 66 for a seamless transition from one of image contents 14 to another one of image contents 14.

Figure 9:
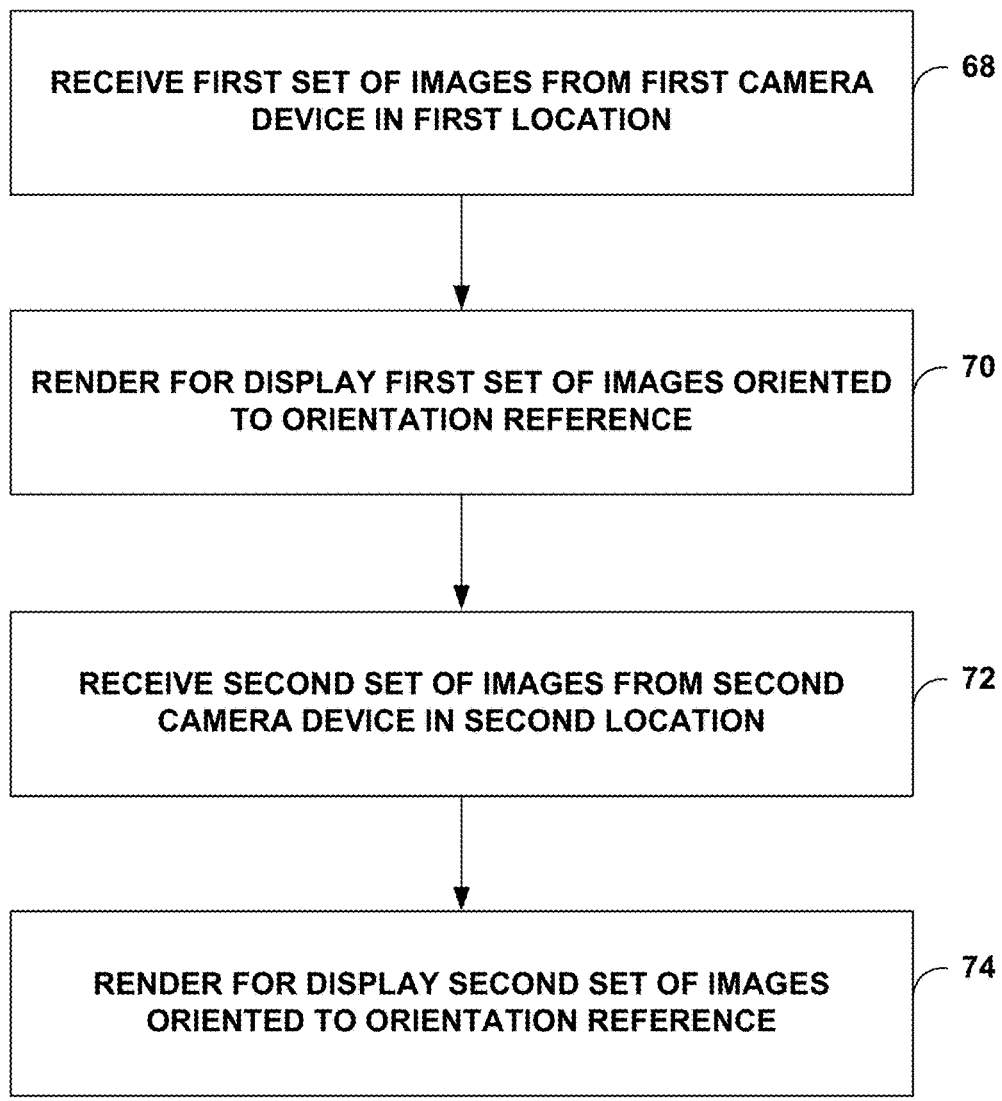
FIG. 9 is a flowchart illustrating an example method of operation according to one or more example techniques described in this disclosure.

FIG. 9 is a flowchart illustrating an example method of operation according to one or more example techniques described in this disclosure. GPU 34 receives a first set of images from a first one of camera devices 12 that is located in a first location (68). The first set of images may be a first set of projection images that have already been oriented to the common orientation reference, may be a first set of projection images that have not already been oriented to the common orientation reference, or may be a first set of circular images captured by lenses 20A and 20B. If the projection images have not been oriented to the common orientation reference, GPU 34 may orient the images to the common orientation reference. For circular images, GPU 34 may texture map the circular images to generate the projection images, and then orient the projection images to a common orientation reference.

GPU 34 may render for display the first of images oriented to the orientation reference (70). For example, GPU 34 may texture map the projection images to a spherical mesh model, and render the spherical mesh model to a sphere of image content for display. GPU 34 may store the image content of the sphere of image content as a stream of images 66.

When CPU 32 determines that GPU 34 is to render display image content captured by a second, different one of camera devices 12 (e.g., switch to rendering for display different image content), GPU 34 receives a second set of images from a second, different one of camera devices 12 that is in a second, different location (72). As with the first set of images, GPU 34 may generate the projection images and orient the projection images to the common orientation reference that is the same orientation reference as the rendered first set of images.

GPU 34 may render for display the second of images oriented to the same orientation reference as the rendered first set of images (74). For example, GPU 34 may texture map the projection images of the second set of images to a spherical mesh model, and render the spherical mesh model to a sphere of image content for display. GPU 34 may store the image content of the sphere of image content as a stream of images 66.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM. EEPROM. CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for generating image content, the method comprising:
receiving a first set of images generated from a first camera device in a first location, the first camera device having a first orientation;
rendering for display the first set of images oriented to an orientation reference;
receiving a second set of images generated from a second camera device in a second location, the second camera device having a second orientation, wherein the second camera device is different than the first camera device and the second orientation is different than the first orientation; and
rendering for display the second set of images oriented to the orientation reference;
wherein rendering for display the first set of images oriented to the orientation reference comprises rendering scene content common to both the first set of images and the second set of images to a location on a display, and
wherein rendering for display the second set of images comprises rendering the scene content common to both the first set of images and the second set of images at the same location on the display as the location of the common scene content in the rendered first set of images.

2. The method of claim 1, further comprising:
determining a gaze or head position of a viewer when the first set of images is rendered for display,
wherein the orientation reference is selected based on the determined gaze or head position of the viewer.

3. The method of claim 1, wherein the orientation reference comprises a geographical direction.

4. The method of claim 1, wherein rendering for display the first set of images comprises rendering for display the first set of images such that image content located in a first geographical direction relative to the first camera device is located at a first coordinate within rendered images of the first set of image, wherein rendering for display the second set of images comprises rendering for display the second set of images such that image content located in a second geographical direction relative to the second camera device is located at a second coordinate within rendered images of the second set of images, and wherein the first geographical direction and the second geographical direction is the same geographical direction, and the first coordinate and the second coordinate is the same coordinate.

5. The method of claim 1, further comprising switching from display of the rendered first set of images to rendering for display the second set of images.

6. The method of claim 1, further comprising:
receiving information indicative of the orientation reference relative to the first set of images;
receiving information indicative of the orientation reference relative to the second set of images;
adjusting an orientation of the first set of images based on the information indicative of the orientation reference relative to the first set of images; and
adjusting an orientation of the second set of images based on the information indicative of the orientation reference relative to the second set of images,
wherein rendering for display the first set of images comprises rendering for display the first set of images having the adjusted orientation, and
wherein rendering for display the second set of images comprises rendering for display the second set of images having the adjusted orientation.

7. The method of claim 1, wherein receiving the first set of images comprises receiving the first set of images oriented to the orientation reference, and wherein receiving the second set of images comprises receiving the second set of images oriented to the orientation reference.

8. The method of claim 1, wherein the orientation reference comprises a first orientation reference, wherein rendering for display the first set of images comprises rendering for display the first set of images oriented to the first orientation reference and a second orientation reference, and wherein rendering for display the second set of images comprises rendering for display the second set of images oriented to the first orientation and the second orientation reference.

9. The method of claim 8, wherein rendering for display the first set of images comprises rendering for display the first set of images oriented to the first orientation reference, the second orientation reference, and a third orientation reference, and wherein rendering for display the second set of images comprises rendering for display the second set of images oriented to the first orientation reference, the second orientation reference, and the third orientation reference.

10. The method of claim 1, wherein the first camera device comprises a plurality of lenses, and the second camera device comprises a plurality of lenses, wherein receiving the first set of images comprises receiving the first set of images generated from image content captured by at least two lenses of the plurality of lenses of the first camera device, and wherein receiving the second set of images comprises receiving the second set of images generated from image content captured by at least two lenses of the plurality of lenses of the second camera device.

11. The method of claim 1, wherein receiving the first set of images comprises receiving a plurality of equirectangular images captured by fisheye lenses of the first camera device, and wherein receiving the second set of images comprises receiving a plurality of equirectangular images captured by fisheye lenses of the second camera device.

12. The method of claim 1, wherein the first set of images and the second set of images are generated at the same time.

13. The method of claim 1, wherein the first set of images include first 360-degree image content and the second set of images include second 360-degree image content.

14. A device for generating image content, the device comprising:
a memory device configured to:
store a first set of images generated from a first camera device in a first location, the first camera device having a first orientation; and
store a second set of images generated from a second camera device in a second location, the second camera device having a second orientation, wherein the second camera device is different than the first camera device and the second orientation is different than the first orientation; and
processing circuitry configured to:
receive the first set of images from the memory device;
render for display the first set of images oriented to an orientation reference;
receive the second set of images from the memory device; and
render for display the second set of images oriented to the orientation reference;
wherein to render for display the first set of images oriented to the orientation reference, the processing circuitry is configured to render scene content common to both the first set of images and the second set of images to a location on a display, and
wherein to render for display the second set of images, the processing circuitry is configured to render the scene content common to both the first set of images and the second set of images at the same location on the display as the location of the common scene content in the rendered first set of images.

15. The device of claim 14, further comprising:
a tracker circuit configured to determine a gaze or head position of a viewer when the first set of images is rendered for display,
wherein the orientation reference is selected based on the determined gaze or head position of the viewer.

16. The device of claim 14, wherein to render for display the first set of images, the processing circuitry is configured to render for display the first set of images such that image content located in a first geographical direction relative to the first camera device is located at a first coordinate within rendered images of the first set of image, wherein to render for display the second set of images, the processing circuitry is configured to render for display the second set of images such that image content located in a second geographical direction relative to the second camera device is located at a second coordinate within rendered images of the second set of images, and wherein the first geographical direction and the second geographical direction is the same geographical direction, and the first coordinate and the second coordinate is the same coordinate.

17. The device of claim 14, wherein the processing circuitry is further configured to switch from rendering for display of the first set of images to rendering for display the second set of images.

18. The device of claim 14, wherein the processing circuitry is configured to:
receive information indicative of the orientation reference relative to the first set of images;
receive information indicative of the orientation reference relative to the second set of images;
adjust an orientation of the first set of images based on the information indicative of the orientation reference relative to the first set of images; and
adjust an orientation of the second set of images based on the information indicative of the orientation reference relative to the second set of images,
wherein to render for display the first set of images, the processing circuitry is configured to render for display the first set of images having the adjusted orientation, and
wherein to render for display the second set of images, the processing circuitry is configured to render for display the second set of images having the adjusted orientation.

19. The device of claim 14, wherein the processing circuitry is configured to receive the first set of images oriented to the orientation reference, and receive the second set of images oriented to the orientation reference.

20. The device of claim 14, wherein the orientation reference comprises a first orientation reference, wherein to render for display the first set of images, the processing circuitry is configured to render for display the first set of images oriented to the first orientation reference and a second orientation reference, and wherein to render for display the second set of images, the processing circuitry is configured to render for display the second set of images oriented to the first orientation and the second orientation reference.

21. The device of claim 20, wherein to render for display the first set of images, the processing circuitry is configured to render for display the first set of images oriented to the first orientation reference, the second orientation reference, and a third orientation reference, and wherein to render for display the second set of images, the processing circuitry is configured to render for display the second set of images oriented to the first orientation reference, the second orientation reference, and the third orientation reference.

22. The device of claim 14, wherein the first camera device comprises a plurality of lenses, and the second camera device comprises a plurality of lenses, wherein to receive the first set of images, the processing circuitry is configured to receive the first set of images generated from image content captured by at least two lenses of the plurality of lenses of the first camera device, and wherein to receive the second set of images, the processing circuitry is configured to receive the second set of images generated from image content captured by at least two lenses of the plurality of lenses of the second camera device.

23. The device of claim 14, wherein to receive the first set of images, the processing circuitry is configured to receive a plurality of equirectangular images captured by fisheye lenses of the first camera device, and wherein to receive the second set of images, the processing circuitry is configured to receive a plurality of equirectangular images captured by fisheye lenses of the second camera device.

24. The device of claim 14, wherein the first set of images and the second set of images are generated at the same time.

25. The device of claim 14, wherein the device comprises one of a microprocessor, integrated circuit, a wireless communication device, or a handheld device.

26. The device of claim 14, wherein the first set of images include first 360-degree image content and the second set of images include second 360-degree image content.

27. A non-transitory computer readable storage medium having instructions stored thereon that when executed cause one or more processors to:
   receive a first set of images generated from a first camera device in a first location, the first camera device having a first orientation;
   render for display the first set of images oriented to an orientation reference;
   receive a second set of images generated from a second camera device in a second location, the second camera device having a second orientation, wherein the second camera device is different than the first camera device and the second orientation is different than the first orientation; and
   render for display the second set of images oriented to the orientation reference;
   wherein the instructions that cause the one or more processors to render for display the first set of images oriented to the orientation reference comprise instructions that cause the one or more processors to render scene content common to both the first set of images and the second set of images to a location on a display, and
   wherein the instructions that cause the one or more processors to render for display the second set of images comprise instructions that cause the one or more processors to render the scene content common to both the first set of images and the second set of images at the same location on the display as the location of the common scene content in the rendered first set of images.

28. A device for generating image content, the device comprising:
   means for receiving a first set of images generated from a first camera device in a first location, the first camera device having a first orientation;
   means for rendering for display the first set of images oriented to an orientation reference;
   means for receiving a second set of images generated from a second camera device in a second location, the second camera device having a second orientation, wherein the second camera device is different than the first camera device and the second orientation is different than the first orientation; and
   means for rendering for display the second set of images oriented to the orientation reference,
   wherein the means for rendering for display the first set of images oriented to the orientation reference comprises means for rendering scene content common to both the first set of images and the second set of images to a location on a display, and
   wherein the means for rendering for display the second set of images comprises means for rendering the scene content common to both the first set of images and the second set of images at the same location on the display as the location of the common scene content in the rendered first set of images.

* * * * *